(12) United States Patent
Ishiyama et al.

(10) Patent No.: US 7,988,944 B2
(45) Date of Patent: Aug. 2, 2011

(54) PEROXIDE DECOMPOSITION CATALYST

(75) Inventors: Takeshi Ishiyama, Tsukuba (JP);
Hideyuki Higashimura, Tsukuba (JP);
Hiroshi Takigawa, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 11/993,892

(22) PCT Filed: Jun. 20, 2006

(86) PCT No.: PCT/JP2006/312677
§ 371 (c)(1),
(2), (4) Date: Jan. 2, 2008

(87) PCT Pub. No.: WO2007/000956
PCT Pub. Date: Jan. 4, 2007

(65) Prior Publication Data
US 2008/0219916 A1  Sep. 11, 2008

(30) Foreign Application Priority Data

Jun. 28, 2005  (JP) ................ 2005-188050

(51) Int. Cl.
*C01B 13/00* (2006.01)
*G01N 33/44* (2006.01)
*C07F 3/12* (2006.01)

(52) U.S. Cl. ............ 423/579; 436/85; 548/108

(58) Field of Classification Search ........... 423/579; 430/943; 435/192; 436/85; 548/108; C01B 13/00; C01F 13/00
See application file for complete search history.

(56) References Cited

U.S. PATENT DOCUMENTS 5,637,739 A  6/1997  Jacobsen et al.
(Continued)

FOREIGN PATENT DOCUMENTS

JP  6-154619 A  6/1994
(Continued)

OTHER PUBLICATIONS

Boelrijk et al., "Mechanism of hydrogen peroxide dismutation by a dimanganese Catalase Mimic: Dominant Role of an Intramolecular Base on Substrate Binding Affinity and Rate Acceleration" Inorg. Chem., 2000, 39 (14), 3020-3028o DOI: 10.1021/ic9911771 o Publication Date (Web): Jun. 17, 2000.*

(Continued)

*Primary Examiner* — Jessica L Ward
*Assistant Examiner* — Alexander Polyansky
(74) *Attorney, Agent, or Firm* — Sughrue Mion, PLLC

(57) ABSTRACT

An object of the present invention is to provide a catalyst which decomposes a peroxide effectively and economically under a high temperature while suppressing generation of free radicals, and the present invention provides a peroxide decomposition catalyst containing a base metal atom, wherein a value A indicating a free radical generation amount represented by the (equation 1) is not more than 0.20, and a value B indicating a reaction rate represented by the (equation 2), which can be easily applied to utility such as an agent for preventing deterioration of a polymer electrolyte-type fuel cell and a water electrolysis apparatus, and an antioxidant for medicaments, agrochemicals and foods.

$A = (Mw(S)/Mw) - 1$    (equation 1)

(wherein Mw is a weight average molecular weight of poly(sodium 4-styrenesulfonate) after a hydrogen peroxide decomposition test in the test at 80° C. in the presence of poly(sodium 4-styrenesulfonate), and Mw(S) is a weight average molecular weight of poly(sodium 4-styrenesulfonate) before the test)

$B = N(PO)/N(\text{cat})$    (equation 2)

(wherein N(po) is a mole number of hydrogen peroxide decomposed per 20 minutes in a hydrogen peroxide decomposition test in the (equation 1), and N(cat) is a mole number per metal atom of a catalyst used).

11 Claims, 1 Drawing Sheet

U.S. PATENT DOCUMENTS

| | | | |
|---|---|---|---|
| 5,663,393 | A | 9/1997 | Jacobsen et al. |
| 2006/0199063 | A1 | 9/2006 | Miura et al. |

FOREIGN PATENT DOCUMENTS

| | | | |
|---|---|---|---|
| JP | 10-508050 | A | 8/1998 |
| JP | 2000-230076 | A | 8/2000 |
| JP | 2001-118591 | A | 4/2001 |
| JP | 2003-123777 | A | 4/2003 |
| JP | 2003-340287 | A | 12/2003 |
| JP | 2004-296425 | A | 10/2004 |
| JP | 2004-327074 | A | 11/2004 |
| JP | 2005-19232 | A | 1/2005 |
| JP | 2005-56776 | A | 3/2005 |
| JP | 2005-63902 | A | 3/2005 |
| JP | 2005-71760 | A | 3/2005 |
| JP | 2005-135651 | A | 5/2005 |

OTHER PUBLICATIONS

D. Curtin et al., "Advanced materials for improved PEMFC performance and life", Journal of Power Sources, (2004), vol. 131, pp. 41-48.

H. Sigel et al., "Metal Ions and Hydrogen Peroxide.1 Catalase-like Activity of Cu2+ in Aqueous Solution and Its Promotion by the Coordination of 2,2'-Bipyridyl", Inorganic Chemistry, vol. 18, No. 5, (1979), pp. 1354-1358.

D.T. Gokak et al., "Preparation, Characterization, and Catalytic Activity of Polymer Supported Ethylenediamine and Glycine Cobalt Complexes", Journal of Applied Polymer Science, (1988), vol. 35, pp. 1523-1535.

E. Lewis et al., "Reactivity of Dioxygen-Copper Systems", Chemical Reviews, (2004), vol. 104, No. 2, pp. 1047-1076.

V. McKee et al., "Hemocyanin Models: Synthesis, Structure, and Magnetic Properties of a Binucleating Cooper (II) System", Journal of American Chemical Society, (1984), vol. 106, No. 17, pp. 4765-4772.

P.J. Pessiki et al., "Structural and Functional Models of the Dimanganese Catalase Enzymes. 2. Structure, Electrochemical, Redox, and EPR Properties", Journal of American Chemical Society, (1994), vol. 116, No. 3, pp. 891-897.

M. Sato et al., "Convenient Synthesis of N,N,N',N'—Tetrakis(2-pyridylmethyl)-alpha,w-alkanediamines Using a Phase-Transfer Catalyst", Synthesis, (1992), pp. 539-540.

W. Armstrong et al., "Convenient, High-Yield Synthesis of (Et4N)2[Fe2OCI6]", Inorganic Chemistry, (1985), vol. 24, No. 6, pp. 981-982.

N. Oishi et al., "Catalytic activity of binuclear manganese (III) complexes for the decomposition of hydrogenperoxide", *Chem. Lett.*, 1982, No. 3, pp. 409, 410.

I.A. Salem et al., "Kinetics and Mechanisms of Decomposition Reaction of Hydrogen Peroxide in presence of Metal Complexes", *Int. J. Chem. Kinet.*, 2000, vol. 32, No. 11, pp. 643-666.

* cited by examiner

PEROXIDE DECOMPOSITION CATALYST

TECHNICAL FIELD

The present invention relates to a peroxide decomposition catalyst.

BACKGROUND ART

A peroxide is easily decomposed by a heavy metal, heat, light or the like, and is known to be accompanied with generation of free radicals such as hydroxyl radical, hydroperoxy radical, an alkylperoxy radical, and an alkoxy radical.

It is thought that, in a living body, at a normal temperature, these free radicals are generated from a peroxide, which are involved in many diseases such as aging, cancer, and arterial sclerosis. In addition, it is reported that, in polymer electrolyte-type fuel cells and water electrolysis apparatuses, a free radical generated from hydrogen peroxide at a high temperature becomes a causative substance for deteriorating an electrolyte, in Dennis E, Curtin, Robert D. Lousenberg, Timothy J. Henry, Paul C. Tangeman, and Monica E. Tisack), J, Power Sources 2004, 131, 41 etc., and the free radical is one of factors of reducing performance in these apparatuses.

In recent years, for the purpose of preventing deterioration of an electrolyte with hydrogen peroxide, several studies concerning a hydrogen peroxide decomposition catalyst have been done. As the catalyst, a noble metal catalyst such as platinum and ruthenium has been reported, but a base metal catalyst is desired from a viewpoint of the cost and a resource amount. As an example of the previous disclosed base metal catalysts, there are exemplified a metal salt, a metal oxide and a metal complex, examples of the metal salt include rare earth phosphates, titanium phosphates, iron phosphates, aluminum phosphates, bismuth phosphates (Japanese Patent Application Laid-Open (JP-A) No. 2005-071760), and tungstates (JP-A No. 2005-019232), and examples of the metal oxide include tungsten oxide (JP-A No. 2005-019232), manganese dioxide (JP-A No. 2001-118591, JP-A No. 2003-123777, and JP-A No. 2005-135651), cobalt oxide (JP-A No. 2003-123777), ceriumoxide (JP-A No. 2004-327074), and iron ferrite (JP-A No. 2005-063902) In addition, as the metal complex, there are reported phthalocyanine iron complexes (JP-A No. 2005-135651, JP-A No. 6-154619) phthalocyanine cobalt complexes or phthalocyanine copper complexes (JP-A No. 6-154619), μ-oxo dinuclear iron complexes (JP-A No. 2004-296425), bipyridyl copper complexes (Helmut Sigel, Kurt Wyss, Beda E. Fischer, and Bernhard, Inorg. Chem. 1979, 18, 1354), and glycine or ethylenediamine/cobalt complexes supported in a polymer (D. T. Gokak, B. V. Kamath, and R. L. Ram, J. Appl. Polym. Sci 1988, 35, 1523).

DISCLOSURE OF THE INVENTION

However, these catalysts have only low activity in a hydrogen peroxide decomposition reaction, and generate a large amount of free radicals at decomposition of hydrogen peroxide, and generation of the free radicals is more remarkable at a higher temperature.

An object of the present invention is to provide a catalyst which suppresses generation of a free radical, and decomposes a peroxide effectively and economically under a high temperature, and provide the catalyst soluble in a solvent, which can be easily applied to utilities such as a deterioration preventing agent for a polymer electrolyte-type fuel cell and a water electrolysis apparatus, and an antioxidant for medicaments and agrochemicals and foods.

That is, the present invention provides the following [1] to [8] peroxide decomposition catalysts.

[1] A peroxide decomposition catalyst comprising a base metal atom, wherein a value A indicating a free radical generation amount represented by the (equation 1) is not more than 0.20, and a value B indicating a reaction rate represented by the (equation 2) is not less than 60.

$$A=(Mw(S)/Mw)-1 \qquad \text{(equation 1)}$$

(wherein Mw is a weight average molecular weight of poly(sodium 4-styrenesulfonate) after a hydrogen peroxide decomposition test in the test at 80° C. in the presence of poly(sodium 4-styrenesulfonate), and Mw is (S) is a weight average molecular weight of poly(sodium 4-styrenesulfonate) before the test)

$$B=N(po)/N(cat) \qquad \text{(equation 2)}$$

(wherein N(po) is a mole number of hydrogen peroxide decomposed per 20 minutes in the hydrogen peroxide decomposition test in the (equation 1), and N(cat) is a mole number of a catalyst used per metal atom)

[2] The peroxide decomposition catalyst according to [1], wherein the catalyst is substantially soluble in a solvent.

[3] The peroxide decomposition catalyst according to [1] or [2], wherein the catalyst comprises a base metal polynuclear complex.

[4] The peroxide decomposition catalyst according to any one of [1] to [3], wherein the base metal atom is a transition metal atom of a first transition element series.

[5] The peroxide decomposition catalyst according to any one of [1] to [4], wherein the base metal atom is at least one kind base metal atom selected from the group consisting of manganese, iron, cobalt and copper.

[6] The peroxide decomposition catalyst according to any one of [1] to [5], wherein the base metal atom is manganese.

[7] The peroxide decomposition catalyst according to any one of [1] to [6], wherein the catalyst comprises a polynuclear complex satisfying the following requirements; having not less than 2 of base metal atoms: having a ligand L having not less than 2 of coordination atoms: having a combination of AM1 and AM2 in which a minimum number of covalent bonds connecting between AM1 and AM2 is not more than 12, referring to two metal atoms selected from the not less than 2 of base metal atoms as $M^1$ and $M^2$, and referring to coordination atoms in L coordinating to $M^1$ or $M^2$ as AM1 or AM2, respectively.

[8] The peroxide decomposition catalyst according to any one of [1] to [7], wherein the catalyst comprises a complex represented by the general formula (I).

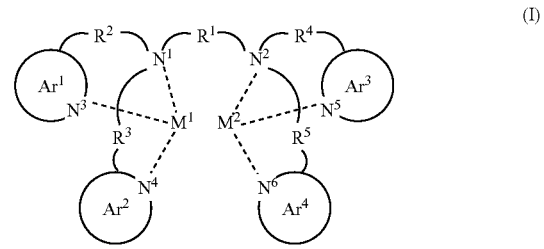

(I)

(wherein $M^1$ and $M^2$ are a base metal atom, and may be the same as or different from each other, $N^1$ to $N^6$ are a nitrogen atom which is to be a coordination atom, $Ar^1$ to $Ar^4$ are an optionally substituted aromatic heterocycle having a nitrogen atom ($N^3$ to $N^6$), respectively, and may be the same as or different from each other, $R^1$ is a bifunctional organic group, the number of bonds intervening between $N^1$ and $N^2$ is not more than 12, $R^2$ to $R^5$ represent an optionally substituted bifunctional hydrocarbon group, and may be the same as or different from each other).

[9] The peroxide decomposition catalyst according to any one of [1] to [8], wherein the catalyst decomposes hydrogen peroxide.

Further, the present invention provides the following [10] with any one of aforementioned peroxide decomposition catalysts.

[10] A method of decomposing a peroxide, comprising decomposing a peroxide at not lower than 45° C. using the peroxide decomposition catalyst according to any one of [1] to [8].

Also, the present invention provides the following [11] analyzing method.

[11] A method of analyzing a radical, comprising quantitating a radical by a change in a molecular weight of an aliphatic polymer using the aliphatic polymer as a radical detecting agent.

In addition, the present invention also provides the following [12] and [13] processes.

[12] A process for producing the peroxide decomposition catalyst according to any one of [1] to [9]1, comprising mixing a compound which donates a ligand L as defined in [7], and a transition metal compound soluble in a solvent, in a solvent.

[13] The process for producing a peroxide decomposition catalyst according to [12], wherein the compound which donates a ligand L is a precursor compound of the ligand L, or a compound represented by a structure of the ligand L itself.

BEST MODE FOR CARRYING OUT THE INVENTION

Figure 1:
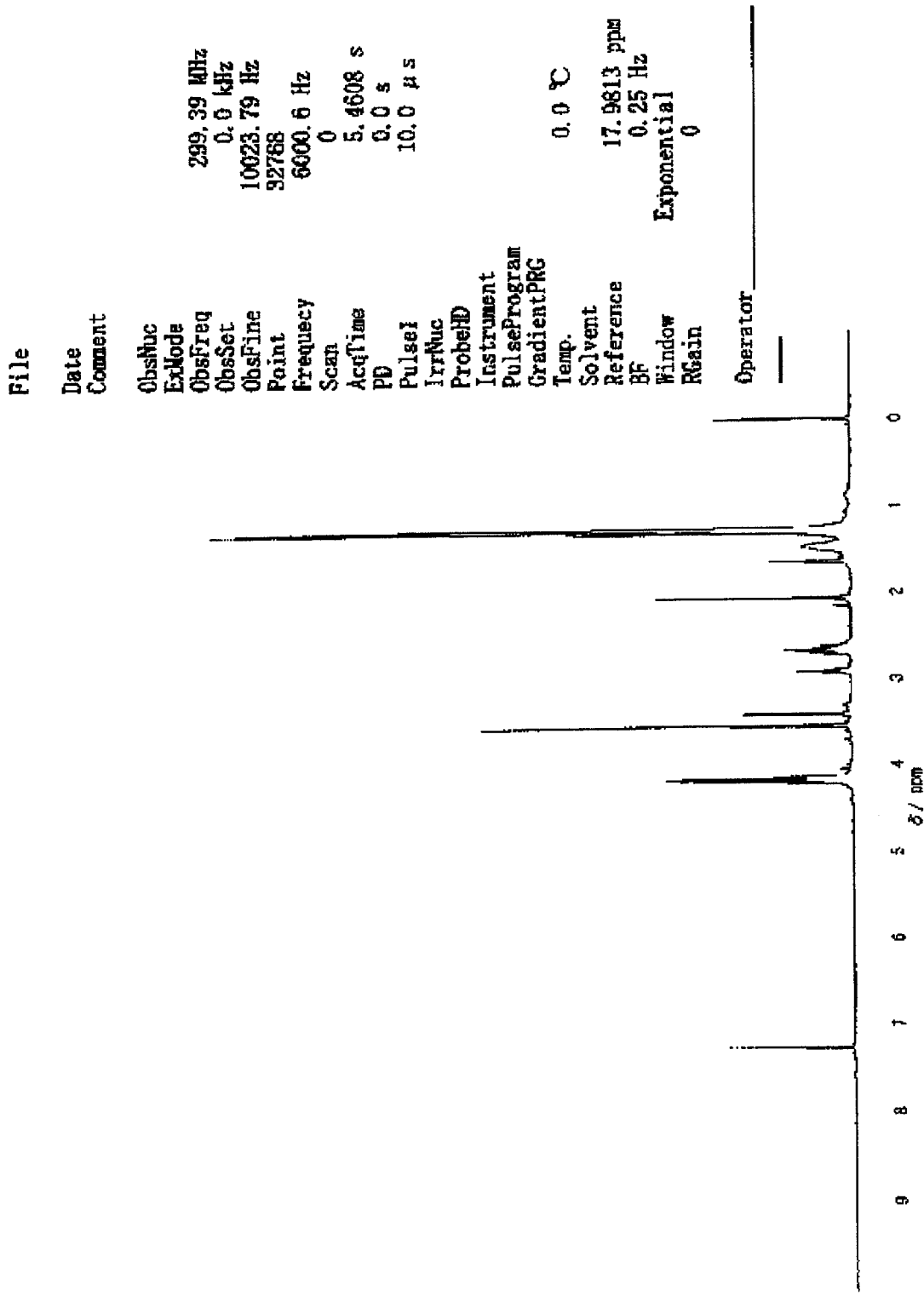
FIG. 1 is a NMR spectrum of an intermediate in Comparative Example 4, $EtO_2$ $(CCH_2)_2N(CH_2)_{12}N(CH_2CH_2OC(O)CH_3)(CH_2CO_2Et)$.

A first aspect of the present invention is a base metal catalyst which decomposes a peroxide, in which a value A indicating a free radical generation amount represented by the (equation 1) is not more than 0.20, and a value B indicating a reaction rate represented by the (equation 2) is not less than 60.

Examples of the peroxide which can be applied to the catalytic peroxide decomposition reaction in the present invention include hydroperoxide such as t-butyl hydroperoxide and cumyl hydroperoxide; dialkyl peroxide such as di-t-butyl peroxide and bistriphenylmethyl peroxide; percarboxylic acid such as performic acid, peracetic acid, perlauric acid, pertrifluoroacetic acid, monoperphthalic acid, monoperscuccinic acid, and perbenzoic acid; peracid ester such as t-butyl perbenzoate, and di-t-butyl peroxalate; diacyl peroxide such as propionyl peroxide, butyryl peroxide, lauroyl peroxide, benzoyl peroxide, and diisopropyloxycarbonyl peroxide; hydrogen peroxide; metal peroxide such as sodium peroxide, magnesium peroxide, calcium peroxide and zinc peroxide. Preferable are hydroperoxide such as t-butyl hydroperoxide, and cumyl hydroperoxide, dialkyl peroxide, percarboxylic acid, peracid ester, diacyl peroxide and hydrogen peroxide, more preferable are hydroperoxide such as t-butyl hydroperoxide, and cumyl hydroperoxide, percarboxylic acid, peracid ester, diacyl peroxide and hydrogen peroxide, and further preferable are t-butyl hydroperoxide and hydrogen peroxide.

Furthermore, the peroxide decomposition catalyst of the present invention is substantially soluble in the solvent. Thereby, the catalyst can be easily introduced in members such as a deterioration preventing agent for a polymer electrolyte-type fuel cell and a water electrolysis apparatus and an antioxidant for medicaments and agrochemicals, and foods. Although a variety of solvents can be used, it is particularly desirable that the catalyst is soluble in an organic solvent. Examples of such the organic solvent include tetrahydrofuran, ether, 1,2-dimethoxyethane, acetonitrile, benzonitrile, acetone, methanol, ethanol, isopropanol, ethylene glycol, 2-methoxyethanol, 1-methyl-2-pyrrolidinone, dimethylformamide, dimethylacetamide, dimethyl sulfoxide, acetic acid, hexane, pentane, benzene, toluene, xylene, dichloromethane, chloroform, and carbon tetrachloride. More preferable are tetrahydrofuran, 1,2-dimethoxyethane, acetonitrile, benzonitrile, acetone, methanol, ethanol, isopropanol, ethylene glycol, 2-methoxyethanol, 1-methyl-2-pyrrolidinone, dimethylformamide, dimethylacetamide, dimethyl sulfoxide, benzene, toluene, xylene, chloroform, and carbon tetrachloride, further preferable are tetrahydrofuran, 1,2-dimethoxyethane, acetonitrile, acetone, methanol, ethanol, isopropanol, ethylene glycol, 2-methoxyethanol, 1-methyl-2-pyrrolidinone, dimethylformamide, dimethylacetamide, and dimethyl sulfoxide, and further more preferable are tetrahydrofuran, acetone, methanol, ethanol, 1-methyl-2-pyrrolidinone, dimethylformamide, dimethylacetamide, and dimethyl sulfoxide. These solvents may be used alone, or two or more kinds may be combined. Among these solvents, upon application to a polymer electrolyte-type fuel cell, inter alia, an ion-conducting membrane for a fuel cell, it is preferable that the catalyst is soluble in a solvent selected from 1-methyl-2-pyrrolidinone, dimethylformamide, dimethylacetamide, and dimethyl sulfoxide.

Herein, as an index of solubility in a peroxide decomposition catalyst, solubility of a peroxide decomposition catalyst (20.0±0.1 mg) in a constant amount (5.0 ml) of dimethylformamide (hereinafter abbreviated as DMF) can be used. The solubility as used herein is represented by the following (equation 3).

$$\text{Solubility (\%)} = \frac{\begin{pmatrix} \text{Weight of peroxide} \\ \text{decomposition} \\ \text{catalyst mixed with } DMF \end{pmatrix} - \begin{pmatrix} \text{Weight of peroxide decomposition} \\ \text{catalyst residue} \\ \text{which remains unsolved in } DMF \end{pmatrix}}{\text{Weight of peroxide decomposition catalyst mixed with } DMF}$$

Solubility is preferably in a range of 40 to 100%, more preferably in a range of 50 to 100%, further preferably in a range of 70 to 100%, even further preferably in a range of 90 to 100%, particularly preferably in a range of 95 to 100%.

The peroxide decomposition catalyst of the present invention is a catalyst comprising a base metal atom. As used herein, the base metal atom is a metal atom other than a noble atom of gold, silver, ruthenium, rhodium, palladium, osmium, iridium, and platinum, as described in "Chemical Dictionary" (1st edition, 1994, Tokyo Kagaku Dozin Co., Ltd). Examples of the base metal atom include lithium, beryllium, sodium, magnesium, gallium, calcium, scandium, titanium, vanadium, chromium, manganese, iron, cobalt, nickel, copper, zinc, gallium, germanium, rubidium, strontium, yttrium, zirconium, niobium, molybdenum, cadmium, indium, tin, antimony, tellurium, cesium, barium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, mercury, thallium, lead, bismuth, polonium, astatine, actinium, thorium, protactinium, and uranium. Preferable are scandium, titanium, vanadium, chromium, manganese, iron, cobalt, nickel, copper, zinc, yttrium, zirconium, niobium, molybdenum, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, mercury, thallium, lead, bismuth, polonium, astatine, actinium, thorium, protactinium, and uranium. More preferable are titanium, vanadium, chromium, manganese, iron, cobalt, nickel, cooper, zinc, niobium, molybdenum, cadmium, lanthanum, cerium, praseodymium, neodymium, promethium, samarium, europium, gadolinium, terbium, dysprosium, holmium, erbium, thulium, ytterbium, lutetium, tantalum, tungsten, rhenium, mercury, bismuth, polonium, astatine, actinium, thorium, protactinium, and uranium, and further preferable are vanadium, chromium, manganese, iron, cobalt, nickel, and cooper.

In addition, the "base metal atom" in the present invention may be neutral or ionic.

The value A defined in the present invention and the value B obtained from a reaction rate are property of a catalyst determined by a hydrogen peroxide decomposition test described in the (equation 1) and the (equation 2) A test method therefor will be shown below.

To a mixture of 8.41 μmol (per one metal atom) of a catalyst and 21.1 mg of poly(sodium 4-styrenesulfonate) (product commercially available from Aldrich, weight average molecular weight: about 70,000) are added 1.00 ml of a tartaric acid/sodium tartrate buffer (pH4.0) and 1.00 ml of ethylene glycol. After this catalyst mixture is stirred at 80° C. for 5 minutes, 0.20 ml of an 11.4 mol/l aqueous hydrogen peroxide solution is added, and the mixture is stirred at 80° C. for 20 minutes. A volume of oxygen generated thereupon is measured with a gas burette, and an amount of decomposed hydrogen peroxide is calculated. Thereafter, this reaction solution is diluted and filtrated, and the filtrate is measured by gel permeation chromatography (GPC), thereby, a weight average molecular weight of poly(sodium 4-styrenesulfonate) after a test is obtained. The GPC analysis condition will be shown below. Column: TSKgel α-M (13 μm, 7.8 mmφ×30 cm) manufactured by Tosoh Corporation, column temperature: 40° C., mobile phase: 50 mmol/l aqueous ammonium acetate solution: $CH_3CN$=7:3 (v/v), flow rate: 0.6 ml/min, detector: RI, injection amount: 50 μl. A weight average molecular weight was obtained as a value in terms of polyethylene oxide. The A value is obtained by the (equation 1), and the B value is obtained by the (equation 2).

The peroxide decomposition catalyst in the present invention uses a compound comprising a base metal atom, preferably a complex compound comprising a base metal atom, and is easily selected from a value A and a value B obtained by performing the hydrogen peroxide decomposition test. Among the selected catalysts, a catalyst soluble in a solvent is preferable.

In the (equation 1), the A value relates to a generation amount of a free radical and, when this exceeds 0.20, a large amount of a free radical is generated at application of the catalyst to a peroxide decomposition reaction, causing phenomenon of deteriorating coexisting substrates and members, being not preferable. A is not more than 0.20, A is preferably not more than 0.18, A is more preferably not more than 0.15, and A is further preferably not more than 0.10.

The present inventors studied, and found out that, as a compound comprising a base metal atom exhibiting such the value A, a polynuclear metal complex having a plurality of base metal atoms in a molecule (base metal polynuclear metal complex) is suitable. A cause for this is not clear, but it is presumed that since a multiple electron moving reaction can be caused due to a plurality of metal centers in a polynuclear metal complex, occurrence of a free radical generated by a one electron moving reaction is suppressed. The polynuclear complex refers to a complex in which two or more metal atoms are contained in one molecule of a complex.

In addition, in the (equation 2), higher N(po)/N(cat), that is, a higher value of B indicates that the catalyst has the high peroxide decomposing activity. In the present invention, in order to obtain a sufficient rate of decomposing a peroxide, the B value is not less than 60, B is preferably not less than 100, the B value is more preferably not less than 180, and B value is further preferably not less than 240. When the B value is too small, a problem is risen that a peroxide can not be effectively decomposed when the A value is not more than 0.20.

The present inventors studied, and found out that, as a compound comprising a base metal atom exhibiting such the B value, depending on a kind of a base metal which is to be an activity center of a catalyst, among the aforementioned preferable metal atoms, inter alia, manganese, iron, cobalt and copper are preferable, and manganese is particularly preferable. A cause for this is not clear, but it is presumed that compounds comprising these base metal atoms have such an oxidation-reduction potential that they can effectively serve as both of an oxidizing agent and a reducing agent, against a peroxide or a free radical species derived from a peroxide.

Only a catalyst satisfying both condition of such the value A and value B can efficiently decompose not only hydrogen peroxide but also other peroxides while suppressing generation of free radicals, and can attain the object of the present invention. In addition, the catalyst functions as a peroxide decomposition catalyst which can suppress generation of a free radical also upon decomposition of a peroxide at a high temperature of around 80° C.

From the above viewpoint, as the peroxide decomposition catalyst of the present invention, a peroxide decomposition catalyst comprising at least one kind base metal atom selected from the group consisting of manganese, iron, cobalt and copper is preferable, a base metal polynuclear complex comprising at least one kind base metal atom selected from the group consisting of manganese, iron, cobalt and copper is further preferable, and a base metal polynuclear complex comprising manganese as a base metal atom is particularly preferable.

In the base metal polynuclear complex, the number of base metal atoms in one molecule of the complex is not particularly limited, but a binuclear complex is more preferable. The binuclear complex refers to a complex having two metal atoms in one molecule of a complex.

Examples of a preferable aspect related to the peroxide decomposition catalyst of the present invention include base metal polynuclear complexes satisfying the following requirements:
(i) having two or more base metal atoms,
(ii) having a ligand L having two or more coordination atoms, (iii) having a combination of AM1 and AM2 in which a minimum number of covalent bonds connecting between AM1 and AM2 is not more than 12, referring to two metal atoms selected from the not less than 2 of base metal atoms as $M^1$ and $M^2$, and referring to coordination atoms in L coordinating to $M^1$ or $M^2$ as AM1 or AM2, respectively.

Definition, example, and preferable example of a base metal in a base metal atom represented by $M^1$ and $M^2$ in the requirements (iii) are as defined above.

L in the requirement (ii) represents a ligand having two or more coordination atoms, and as described in (iii), $M^1$ and $M^2$ are bound with at least one separate coordination atom, respectively. In a combination of a coordination atom bound to $M^1$ (AM1) and a coordination atom bound to $M^2$ (AM2), at least one set of a combination of coordination atoms in which the number of covalent bonds intervening between those two coordination atoms is not more than 12 is possessed. As used herein, the number of covalent bonds intervening between two coordination atoms is the number of covalent bonds when two coordination atoms are connected with a minimum number of bonds. For example, for a complex of the formula (II), in a combination of coordination atoms bound to two metals, the number of covalent bonds present between coordination atoms which coordinate to $M^1$ and $M^2$, respectively, is 0 since $M^1$ and $M^2$ are coordinated (cross-linked) at the same coordination atom $O^1$ between $M^1$-$O^1$-$M^2$. A minimum of the number of covalent bonds connecting coordination atoms is 2 between $M^1$-$O^2$—$O^3$-$M^2$, a minimum of covalent bonds connecting between coordination atoms is 3 between $M^1$-$O^1$—$N^{20}$-$M^2$ and between $M^2$-$O^1$—$N^{10}$-$M^1$, and a minimum of the number of covalent bonds connecting between coordination atoms is 4 between $M^1$-$N^{10}$—$N^{20}$-$M^2$.

On the other hand, in a complex of the formula (12), the number of covalent bonds is 19 between $M^1$-$O^1$—$O^3$-$M^2$, between $M^1$-$O^2$—$O^4$-$M^2$, between $M^1$-$O$—$O$-$M^2$, and between $M^1$-$O^2$—$O^3$-$M^2$. The number of covalent bonds is 16 between $M^1$-$O^1$—$N$-$M^2$, between $M^1$-$O^2$—$N^2$-$M^2$, between $M^1$-$N^1$—$O^3$-$M^2$, and between $M^1$-$N^1$—$O^4$-$M^2$. The number of covalent bonds is 13 between $M^1$-$N^1$—$N^2$-$M^2$. Like this, as a preferable binuclear complex applied to the present invention, a complex of the formula (11) satisfying the requirement (iii) in which the number of covalent bonds connecting AM1 and AM2 is not more than 12 is preferable. In addition, the number attached to coordination atoms in the formula (11) and the formula (12) is described for explaining the number of covalent bonds, and L in the formula (12) represents an arbitrary ligand.

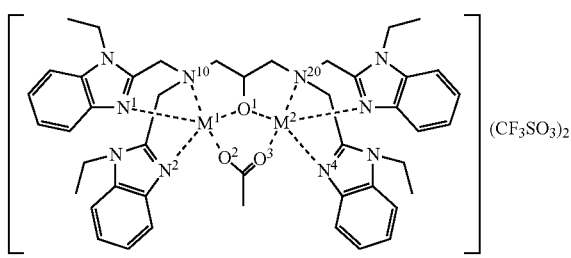

(11)

The minimum number of the bonds intervening a coordination atom bound to $M^1$ and a coordination atom bound to $M^2$ is preferably in a range of 1 to 12, more preferably in a range of 1 to 8, further preferably in a range of 1 to 6, even further preferably in a range of 1 to 5. Like this, as the number of covalent bonds is smaller, $M^1$ and $M^2$ become in a form where they are close to each other in a complex, a compound comprising a base metal atom in which the value A is not more than 0.20 is easily formed, and this can be suitably applied to the present invention.

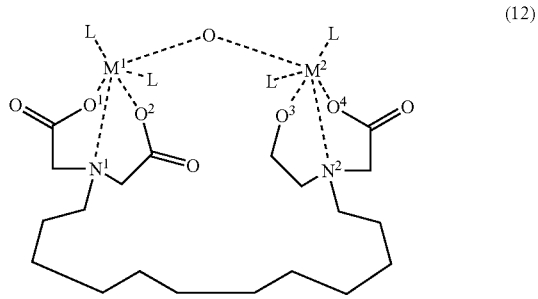

(12)

In addition, the polynuclear complex represented by the requirements (i) to (iii) may comprise a base metal atom other than $M^1$ and $M^2$ in a range satisfying the aforementioned conditions.

A complex structure represented by the requirements (i) to (iii) requires one or more counter ions in some cases so that electric neutrality is retained. As a counter anion, a conjugated base of Broensted acid is usually used, and examples include halide ions such as fluoride ion, chloride ion, bromide ion, and iodide ion; sulfate ion; nitrate ion; carbonate ion; perchlorate ion; tetrafluoroborate ion; tetraarylborate ion such as tetraphenylborate ion; hexafluorophosphate ion; methanesulfonate ion; trifluoromethanesulfonate ion; p-toluenesulfonate ion; benzenesulfonate ion; phosphate ion; phosphite ion; acetate ion; trifluoroacetate ion; propionate ion; benzoate ion; hydroxide ion; metal oxide ion; methoxide ion; ethoxide ion etc. As a counter cation, alkali metal ion; alkaline earth metal ion; tetraalkylammonium ion such as tetra(n-butyl) ammonium ion, and tetraethylammonium ion; tetraarylphosphonium ion such as tetraphenylphosphonium ion and the like can be conveniently used. A preferable counter anion is sulfate ion, nitrate ion, perchlorate ion, tetrafluoroborate ion, tetraphenylborate ion, hexafluorophosphate ion, methanesulfonate ion, trifluoromethanesulfonate ion, p-toluenesulfonate ion, and benzenesulfonate ion, a more preferable counter anion is nitrate ion, perchlorate ion, tetraphenylborate ion, methanesulfonate ion, trifluoromethanesulfonate ion, p-toluenesulfonate ion, and benzenesulfonate ion, and a further preferable counter anion is tetraphenylborate ion, and trifluoromethanesulfonate ion. A preferable counter cation is lithium ion, sodium ion, potassium ion, rubidium ion, cesium ion, tetra(n-butyl) ammonium ion, tetraethyl ammonium ion, and tetraphenyl phosphonium ion, a more preferable counter cation is (n-butyl) ammonium ion, tetraethyl ammonium ion, and tetraphenyl phosphonium ion, and a further preferable counter cation is tetra(n-butyl) ammonium ion, and tetraethyl ammonium ion.

As the peroxide decomposition catalyst of the present invention, a base metal atom may be coordinated with one or more ligands in such a range that its catalyst performance is not inhibited, in addition to a complex structure represented by the requirements (i) to (iii). Examples of the ligand include a neutral molecule such as hydrogen fluoride, hydrogen chloride, hydrogen bromide, hydrogen iodide, ammonia, water, hydrogen sulfide, carbonic acid, phosphoric acid, phosphorous acid, hydrogen cyanide, cyanic acid, thiocyanic acid, isothiocyanic acid, methanol, ethanol, propanol, isopropanol, ethylene glycol, phenol, catechol, methanethiol, ethanethiol, benzenethiol, 1,2-benzenedithiol, 1,2-ethanedithiol, 2-mercaptoethanol, ethylamine, triethylamine, ethylenediamine, ethanolamine, pyridine, imidazole, N-methylimidazole, acetic acid, propionic acid, benzoic acid, oxalic acid, citric acid, tartaric acid, trifluoroacetic acid, acetylacetone, 1,1,1,5,5,5-hexafluoroacetylacetone, glycine, iminodiacetic acid, 8-hydroquinoline, acetone, acetonitrile, and benzonitrile, and an anion obtained by removing one or more protons from the neutral molecule. The ligand may be bound so as to cross-link a plurality of metals. The ligand is preferably a neutral molecule such as ammonia, water, hydrogen sulfide, carbonic acid, phosphoric acid, phosphorous acid, hydrogen cyanide, cyanic acid, thiocyanic acid, isothiocyanic acid, methanol, ethanol, propanol, isopropanol, ethylene glycol, phenol, catechol, methanethiol, ethanethiol, benzenethiol, 1,2-benzenedithiol, 1,2-ethanedithiol, 2-mercaptoethanol, ethylamine, triethylamine, pyridine, imidazole, N-methylimidazole, acetic acid, propionic acid, benzoic acid, oxalic acid, citric acid, tartaric acid, trifluoroacetic acid, acetylacetone, 1,1,1,5,5,5-hexafluoroacetylacetone, glycine, 8-hydroquinoline, acetone, acetonitrile, and benzonitrile, and an anion obtained by removing one or more protons from the neutral molecule, more preferably a neutral molecule such as water, carbonic acid, phosphoric acid, phosphorous acid, ethylene glycol, catechol, 1,2-benzenedithiol, 1,2-ethanedithiol, ethylamine, triethylamine, pyridine, imidazole, N-methylimidazole, acetic acid, propionic acid, benzoic acid, oxalic acid, citric acid, tartaric acid, trifluoroacetic acid, acetylacetone, 1,1,1,5,5,5-hexafluoroacetylacetone, glycine, 8-hydroquinoline, acetone, acetonitrile, and benzonitrile, and an anion obtained by removing one or more protons from the neutral molecule, further preferably a neutral molecule such as water, carbonic acid, phosphoric acid, phosphorous acid, ethylamine, triethylamine, pyridine, imidazole, N-methylimidazole, acetic acid, propionic acid, benzoic acid, oxalic acid, citric acid, tartaric acid, trifluoroacetic acid, acetylacetone, 1,1,1,5,5,5-hexafluoroacetylacetone, glycine, 8-hydroquinoline, acetone, acetonitrile, and benzonitrile, and an anion obtained by removing one or more protons from the neutral molecule.

In addition, among complexes satisfying the requirements (i) to (iii), more preferable is a complex represented by the following general formula (I).

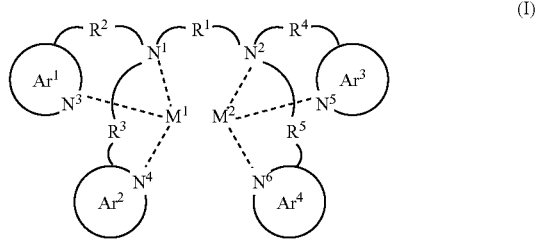

(I)

(wherein $M^1$ and $M^2$ are a base metal atom, and may be the same as or different from each other, $N^1$ to $N^6$ are a nitrogen atom which is to be a coordination atom, $Ar^1$ to $Ar^4$ are an optionally substituted aromatic heterocycle having at least one nitrogen atom, respectively, and may be the same as or different from each other, $R^1$ is a bifunctional organic group, the number of bonds intervening $N^1$ and $N^2$ is not more than 12, and $R^2$ to $R^5$ represent an optionally substituted bifunctional hydrocarbon group, and may be the same as or different from each other).

Definition, example, and preferable example of a base metal atom of $M^1$ and $M^2$ in the general formula (I) are as defined above. In addition, $M^1$ and $M^2$ may be bound to one or more ligands in such a range that its catalyst performance is not inhibited, in addition to a complex structure shown in the figure. Examples of the ligand include the same examples as those described above.

In the general formula (I), $Ar^1$ to $Ar^4$ are an optionally substituted aromatic heterocycle having at least one nitrogen atom, respectively. The aromatic heterocyclic group referred herein includes also a fused ring group comprising an aromatic heterocycle. The heterocycle is a cyclic compound comprising an atom such as a heteroatom other than carbon, as described in "Chemical Dictionary" (1st edition, 1994, Tokyo Kagaku Dozin Co., Ltd). The fused ring is a cyclic structure in which respective rings share two or more atoms, in a cyclic compound having two or more rings, as described in "Chemical Dictionary" ($1^{st}$ edition, 1994, Tokyo Kagaku Dozin Co., Ltd).

Examples of the aromatic heterocycle include pyrrolyl group, imidazolyl group, pyrazolyl group, 1H-1,2,3-triazolyl group, 2H-1,2,3-triazolyl group, 1H-1,2,3-triazolyl group, 4H-1,2,4-triazolyl group, 1H-tetrazolyl group, oxazolyl group, isoxazolyl group, thiazolyl group, isothiazolyl group, phthalazyl group, pyridyl group, pyrazyl group, pyrimidyl, pyridazyl group, 1,3,5-triaziryl group, and 1,3,4,5-tetraziryl group.

Examples of the fused ring group comprising an aromatic heterocycle include indolyl group, isoindolyl group, indolyzinyl group, benzimidazolyl group, 1H-indazolyl group, benzoxazolyl group, benzothiazolyl group, quinolyl group, isoquinolyl group, cinnolyl group, quinazolyl group, quinoxalyl group, phthalazyl group, 1,8-naphthyridyl group, pteridyl group, carbazolyl group, phenanthridyl group, 1,10-phenanthrolyl group, purinyl group, pteridyl group and pyrimidyl group. Further, not only these, but also a higher order fused ring group comprising these aromatic heterocycle skeleton structures, and optionally substituted these aromatic heterocycle fused ring groups are also included.

The aromatic heterocycle group $Ar^1$ to $Ar^4$ in the general formula (1) is preferably benzimidazolyl group, pyridyl group, imidazolyl group, pyrazolyl group, oxazolyl group, thiazolyl group, isoxazolyl group, isothiazolyl group, pyrazyl group, pyrimidyl group, and pyridazyl group, more preferably benzimidazolyl group, pyridyl group, imidazolyl group, and pyrazolyl group, further preferably benzimidazolyl group, pyridyl group, and imidazolyl group.

Examples of a substituent on a substituted aromatic heterocycle group $Ar^1$ to $Ar^4$ include halogeno group such as fluoro group, chloro group, bromo group, and iodo group; hydroxy group; carboxyl group; mercapto group; sulfonic acid group; nitro group; straight, branched or cyclic saturated hydrocarbon group of a total carbon number of around 1 to 50 such as methyl group, ethyl group, propyl group, isopropyl group, cyclopropyl group, butyl group, isobutyl group, t-butyl group, pentyl group, cyclopentyl group, hexyl group, cyclohexyl group, norbonyl group, nonyl group, cyclononyl group, decyl group, 3,7-dimethyl octyl group, adamantyl group, dodecyl group, cyclododecyl group, pentadecyl group, octadecyl group, and dococyl group (the saturated hydrocarbon group may be substituted with the aforementioned halogeno group, hydroxy group, carboxyl group, mercapto group, sulfonic acid group, saturated hydrocarbon group, and the following aromatic group, —ORa group, —C(=O)Rb group, —NRcRd group, —SiReRfRg group, —P(=O) RhRi group, —P(=S) RjRk group, —SRl group, or —SO$_2$Rm group); aromatic group of a total carbon number of around 2 to 60 such as phenyl group, 4-methylphenyl group, 4-t-butylphenyl group, 1-naphtyl group, 2-naphtyl group, pyridyl group, phthalazyl group, oxazolyl group, imidazolyl group, pyrazolyl group, pyrazyl group, pyrimidyl group, pyridazyl group, and benzimidazolyl group (the aromatic group may be substituted with the aforementioned halogeno group, hydroxy group, carboxyl group, mercapto group, sulfonic acid group, saturated hydrocarbon group, aromatic group, and the following —ORa group, —C(=O)Rb group, —NRcRd group, —SiReRfRg group, —P(=O) RhRi group, —P(=S) RjRk group, —SRl group, or —SO$_2$Rm group); —ORa group in which Ra is any one of the aforementioned saturated hydrocarbon group, substituted saturated hydrocarbon group, aromatic group, and substituted aromatic group; —C(=O)Rb group in which Rb is any one of hydrogen atom, the aforementioned saturated hydrocarbon group, substituted saturated hydrocarbon group, aromatic group, and substituted aromatic group; —NRcRd group in which Rc and Rd are any one of hydrogen atom, the aforementioned saturated hydrocarbon group, substituted saturated hydrocarbon group, aromatic group, and substituted aromatic group, respectively (provided that Rc and Rd may be the same or different); —SiReRfRg group in which Re to Rg are any one of hydrogen atom, the aforementioned saturated hydrocarbon group, substituted saturated hydrocarbon group, aromatic group, and substituted aromatic group, respectively (provided that Re to Rg may be the same as or different from each other); —P(=O)RhRi group in which Rh and Ri are any one of hydrogen atom, hydroxy group, the aforementioned saturated hydrocarbon group, substituted saturated hydrocarbon group, aromatic group, substituted aromatic group, and —ORa group, respectively (provided that Rh and Ri may be the same as or different from each other); —P(=S) RjRk group in which Rj and Rk are any one of hydrogen atom, hydroxy group, the aforementioned saturated hydrocarbon group, substituted saturated hydrocarbon group, aromatic group, substituted aromatic group, and —ORa group, respectively (provided that Rj and Rk may be the same as or different from each other); —SRL group in which RL is represented by any one of the aforementioned saturated hydrocarbon group, substituted saturated hydrocarbon group, aromatic group, and substituted aromatic group; —SO$_2$Rm group in which Rm is Represented by any one of the aforementioned saturated hydrocarbon group, substituted saturated hydrocarbon group, aromatic group, and substituted aromatic group.

A position of a substituent on the aromatic heterocycle is an arbitrary position on Ar$^1$ to Ar$^4$, and the number of substituents and a combination of them are arbitrary.

A substituent on an aromatic heterocycle group of substituted Ar$^1$ to Ar$^4$ is preferably hydroxy group, carboxyl group, marcapto group, sulfonic acid group, nitro group, the aforementioned saturated hydrocarbon group, substituted saturated hydrocarbon group, aromatic group, substituted aromatic group, —ORa group, —C(=O)Rb group, —NRcRd group, —SiReRfRd group, —P(=O)RhRi group, —P(=S) RjRk group, —SRL group, and —SO$_2$Rm group, more preferably hydroxy group, carboxyl group, mercapto group, sulfonic acid group, saturated hydrocarbon group, aromatic group, —ORa group, —C(=O)Rb group, —NRcRd group, —P(=O)RhRi group, —P(=S)RjRk group, —SRL group, and —SO$_2$Rm group, further preferably hydroxy group, carboxyl group, sulfonic acid group, saturated hydrocarbon group, aromatic group, —C(=O)Rb group, —NRcRd group, —P(=O)RhRi group, and —P(=S)RjRk group.

R$^1$ in the general formula (I) is a bifunctional organic group, and the number of bonds intervening between N$^1$ and N$^2$ is not more than 12. R$^1$ is composed of the following bifunctional saturated hydrocarbon group, bifunctional aromatic group, or bifunctional heteroatom functional group, and any one of them may be used as it is, or an arbitrary combination of them is used.

Examples of the bifunctional saturated hydrocarbon group of R$^1$ include a straight, branched or cyclic saturated hydrocarbon group of a total carbon number of around 1 to 50 such as methylene group, ethylene group, propylene group, isopropylene group, butylene group, pentylene group, hexylene group, 1,4-cyclohexylene group, nonylene group, decylene group, dodecylene group, pentadecylene group, and octadecylene group.

The bifunctional aromatic group of R$^1$ is a divalent group which occurs when an aromatic compound loses two or more hydrogen atoms. Herein, examples of the aromatic compound include benzene, naphthalene, anthracene, tetracene, biphenyl, biphenylene, acenaphthylene, phenalene, pyrene, furan, thiophene, pyrrole, pyridine, oxazole, isoxazole, thiazole, isothiazole, imidazole, pyrazole, pyrazine, pyrimidine, pyridazine, benzofuran, isobenzofuran, 1-benzothiophene, 2-benzothiophene, indole, isoindole, indolizine, carbazole, xanthene, quinoline, isoquinoline, 4H-quinolizine, phenanthridine, acridine, 1,8-naphthyridine, benzimidazole, 1H-imidazole, quinoxaline, quinazoline, cinnoline, phthalazine, purine, pteridine, pyrimidine, 1,10-phenanthroline, thianthrone, phenoxathiine, phenoxazine, phenothiazine, phenazine, and phenarsazine.

Examples of the bifunctional heteroatom functional group of R$^1$ include —O—, —CO—, —NRn— (Rn is any one of hydrogen atom, the aforementioned saturated hydrocarbon group, substituted saturated hydrocarbon group, aromatic group, and substituted aromatic group in examples of the aforementioned substituent on substituted Ar$^1$ to Ar$^4$ aromatic hydrocarbon groups), —SiRoRp-(Ro and Rp are any one of hydrogen atom, the aforementioned saturated hydrocarbon group, substituted saturated hydrocarbon group, aromatic group, and substituted aromatic group in examples of the aforementioned substituent on substituted Ar$^1$ to Ar$^4$ aromatic heterocycle groups, respectively, and Ro and Rp may be the same or different from each other), —P(=O) Rq—(Rq is any one of hydrogen atom, hydroxy group, the aforementioned saturated hydrocarbon group, substituted saturated hydrocarbon group, aromatic group, substituted aromatic group, and —ORa group in examples of the substituent on substituted Ar$^1$ to Ar$^4$ aromatic heterocycle groups), —P(=S)Rr—(Rr is any one of hydrogen atom, hydroxy group, the aforementioned saturated hydrocarbon group, substituted saturated hydrocarbon group, aromatic group, substituted aromatic group, and —ORa group, in examples of the substituted on substituting Ar$^1$ to Ar$^4$ aromatic heterocycle groups), —S—, and —SO$_2$—.

The bifunctional saturated hydrocarbon group or the bifunctional aromatic group in R$^1$ may be substituted. Examples of the substituent include the aforementioned substituents on the substituting Ar$^1$ to Ar$^4$ aromatic heterocyclic groups. A position of these substituents is an arbitrary position in R$^1$, and the number of substituents and a combination of them are arbitrary.

Particularly, it is preferable that R$^1$ comprises a functional group with which a metal atom can be coordinated. The functional group with which a metal atom can be coordinated include hydroxy group, carboxyl group, carbonyl group, mercapto group, sulfonic acid group, phosphonic acid group, nitro group, cyano group, ether group, acyl group, ester group, amino group, phosphoryl group, thiophosphoryl group, sulfide group, sulfonyl group, pyrrolyl group, pyridyl group, oxazolyl group, isoxazolyl group, thiazolyl group, isothiazolyl group, imidazolyl group, pyrazolyl group, pyrazyl group, pyrimidyl group, pyridazyl group, indolyl group, isoindolyl group, carbazolyl group, quinolyl group, isoquinolyl group, 1,8-naphthyridyl group, benzimidazolyl group, 1H-indazolyl group, quinoxalyl group, quinazolyl group, cinnolyl group, phthalazyl group, purinyl group, pteridyl group, and pyrimidyl group.

Preferable examples include hydroxy group, carboxyl group, carbonyl group, sulfonic acid group, phosphonic acid group, nitro group, cyano group, ether group, acyl group, amino group, phosphoryl group, thiophosphoryl group, sulfonyl group, pyrrolyl group, pyridyl group, oxazolyl group, isoxazolyl group, thiazolyl group, isothiazolyl group, imidazolyl group, pyrazolyl group, pyrazyl group, pyrimidyl group, pyridazyl group, indolyl group, isoindolyl group, quinolyl group, isoquinolyl group, 1,8-naphthyridyl, benzimidazolyl group, 1H-indazolyl group, quinoxalyl group, quinazolyl group, cinnolyl group, phthalazyl group, purinyl group, pteridyl group, and pyrimidyl group, and more preferable examples include hydroxy group, carboxyl group, carbonyl group, sulfonic acid group, phosphonic acid group, cyano group, ether group, acyl group, amino group, phosphoryl group, sulfonyl group, pyridyl group, imidazolyl group, pyrazolyl group, pyrimidyl group, pyridazyl group, quinolyl group, isoquinolyl group, 1,8-naphthyridyl group, benzimidazolyl group, 1H-indazolyl group, cinnolyl group, phthalazyl group, and pteridyl group. Among the aforementioned functional groups, functional groups having a N—H bond, an O—H bond, or an S—H bond release a proton to be anionic upon coordination to a metal atom.

As $R^1$, $N^1$—$R^1$—$N^2$ chains represented by the following formulas (b-1) to (b-4) can be exemplified.

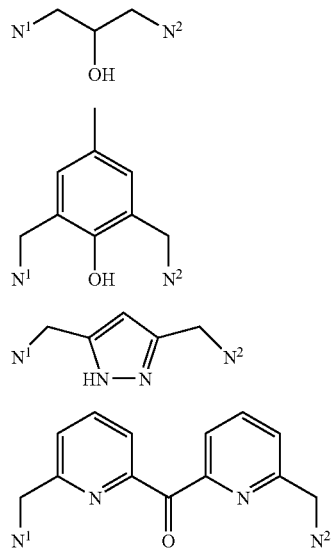

Herein, a hydroxy group in (b-1) or (b-2), or a pyrazole ring of (b-3) releases a proton to be anionic upon coordination to a metal atom as a ligand in some cases.

$R^2$ to $R^5$ in the general formula (1) represent a bifunctional hydrocarbon group, and may be the same as or different from each other. As $R^2$ to $R^5$, the same bifunctional saturated hydrocarbon group, bifunctional aromatic group, substituted bifunctional saturated hydrocarbon group, and substituted bifunctional aromatic group as those described for $R^1$ can be exemplified. $R^2$ to $R^5$ are preferably methylene group, 1,1-ethylene group, 2,2-propylene group, 1,2-ethylene group, or 1,2-phenylene group, more preferably methylene group, or 1,2-ethylene group.

As the binuclear complex represented by the general formula (1), specifically, the following binuclear complexes can be exemplified.

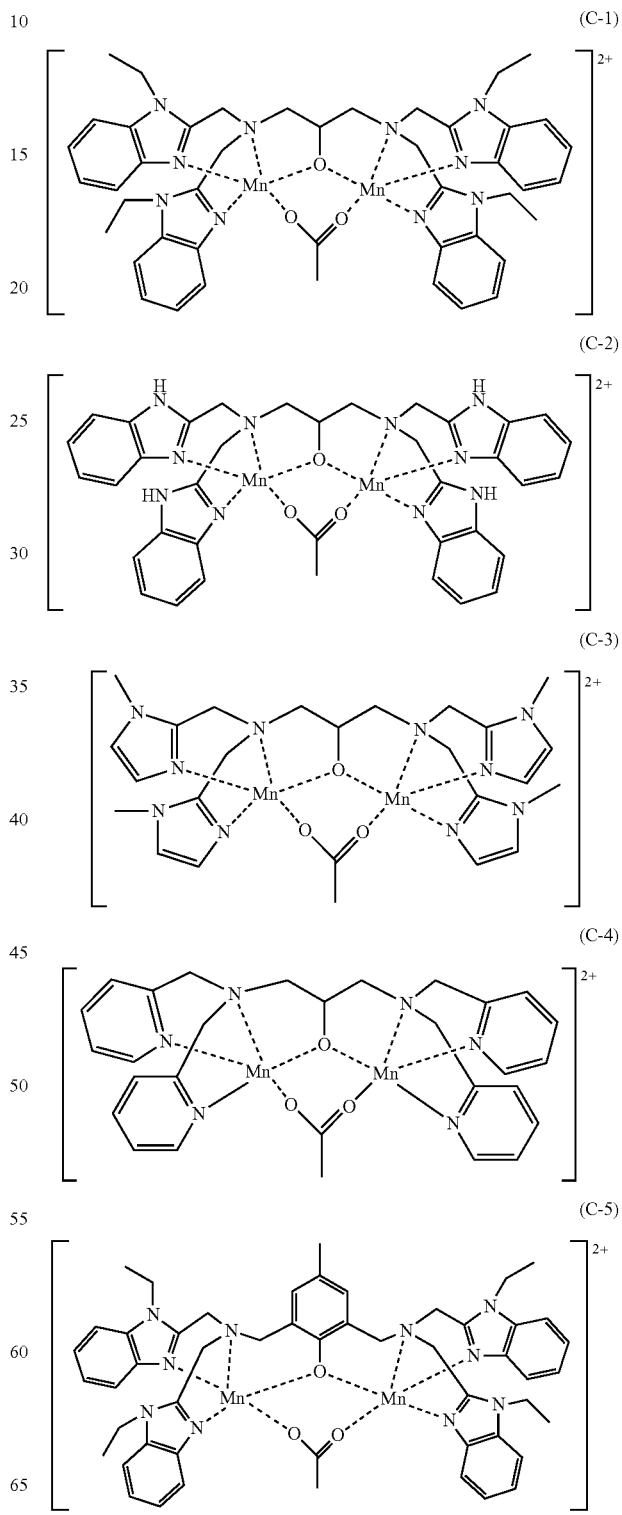

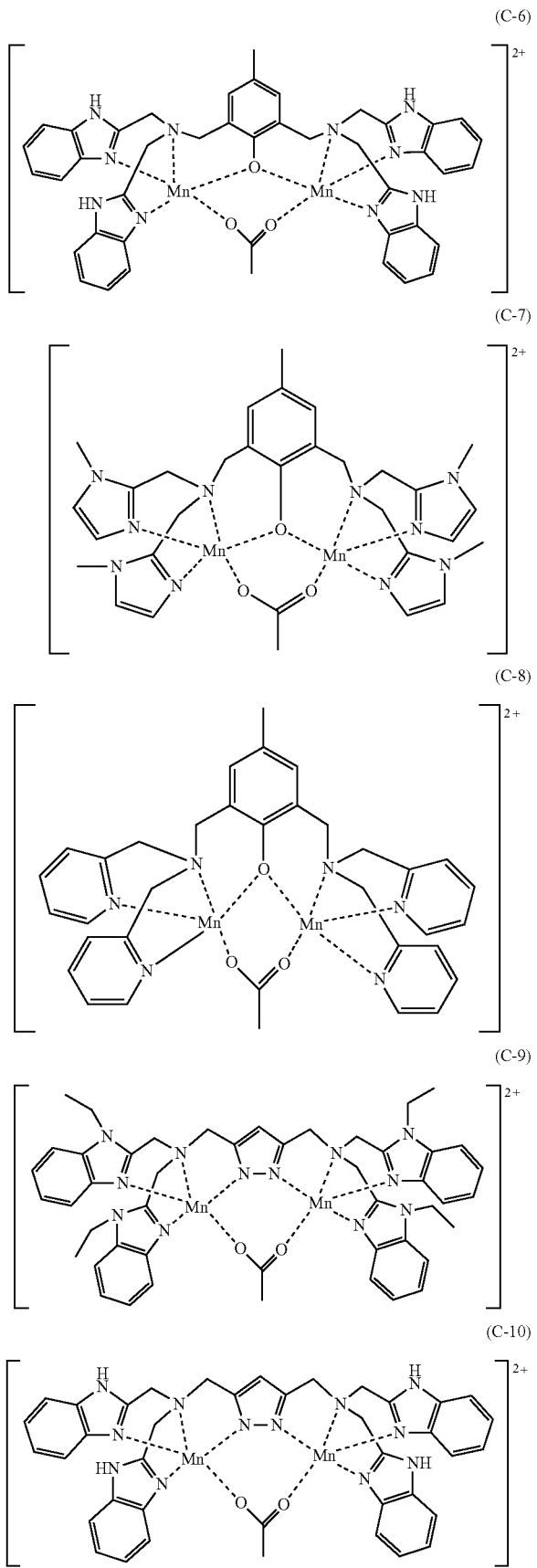

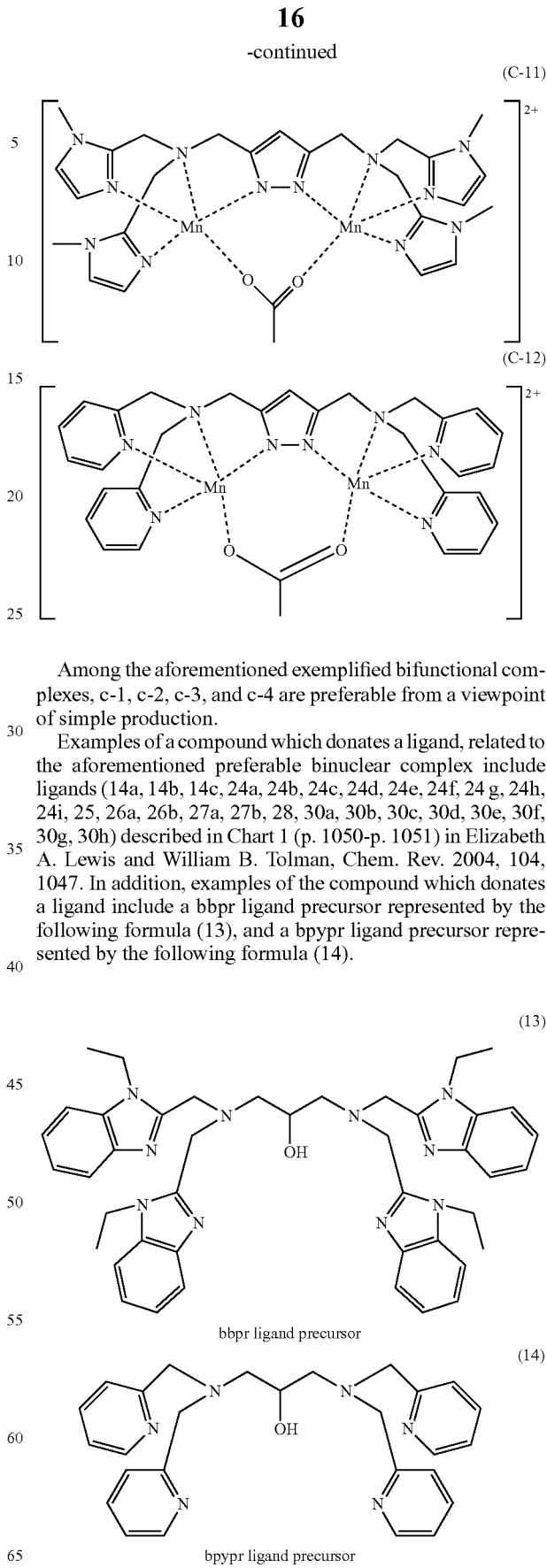

Among the aforementioned exemplified bifunctional complexes, c-1, c-2, c-3, and c-4 are preferable from a viewpoint of simple production.

Examples of a compound which donates a ligand, related to the aforementioned preferable binuclear complex include ligands (14a, 14b, 14c, 24a, 24b, 24c, 24d, 24e, 24f, 24 g, 24h, 24i, 25, 26a, 26b, 27a, 27b, 28, 30a, 30b, 30c, 30d, 30e, 30f, 30g, 30h) described in Chart 1 (p. 1050-p. 1051) in Elizabeth A. Lewis and William B. Tolman, Chem. Rev. 2004, 104, 1047. In addition, examples of the compound which donates a ligand include a bbpr ligand precursor represented by the following formula (13), and a bpypr ligand precursor represented by the following formula (14).

Examples of a process for producing the aforementioned preferable binuclear complex catalyst include a method of mixing a compound which donates a ligand L, and a transition metal compound in a solvent. Examples of the compound which donates a ligand L include a precursor compound of a ligand L, and a ligand compound, that is, a compound represented by a structure of a ligand L itself. As the transition metal compound, a transition metal compound soluble in the solvent is preferable. In this case, the resulting complex catalyst becomes soluble in a solvent, and it becomes extremely easy to introduce the catalyst into a member such as an electrolyte, being preferable.

Examples of a preferable precursor compound of a ligand L include the above-exemplified precursor compounds of a ligand L related to a binuclear complex.

Preferable examples of the transition metal compound include transition metal salts soluble in a solvent.

Alternatively, it is also possible to add a suitable salt to the complex forming reaction to change a counter ion in a complex catalyst into an ion derived from an addition salt. A preferable addition salt includes the aforementioned preferable counter ion.

Examples of a specific process of production include a method of synthesizing Mn-bbpr or Mn-bpypr described below. The following is an equation of a reaction of forming a complex, Mn-bbpr, using a bbpr ligand precursor.

As the complex catalyst, a previously synthesized catalyst can be used, or a complex catalyst may be formed in a reaction system.

Then, a method of decomposing a peroxide with the catalyst of the present invention will be explained.

In the method of decomposing peroxide using the peroxide decomposition catalyst of the present invention, the reaction condition is not particularly limited, and is not limited to the condition for the aforementioned peroxide decomposition test.

In the method of decomposing a peroxide of the present invention, a reaction temperature is not particularly limited as far as it is in such a range that a reaction mixture retains a liquid nature, but is preferably not lower than 45° C.

One preferable aspect of the present invention is a peroxide decomposition method of decomposing a peroxide at not lower than 45° C. using the aforementioned peroxide decomposition catalyst.

A reaction temperature is further preferably not lower than 45° C. and not higher than 300° C., more preferably not lower than 55° C. and not higher than 250° C., particularly preferably not lower than 60° C. and not higher than 200° C., most preferably not lower than 70° C. and not higher than 150° C.

An amount of the catalyst to be used in the method of decomposing a peroxide of the present invention is not particularly limited, but an amount of the catalyst to be used is preferably 0.00001 to 50 mol % (per one metal atom), more preferably 0.00001 to 10 mol % (per one metal atom), further preferably 0.01 to 1 mol % (per one metal atom) based on a subject peroxide.

In the method of decomposing a peroxide, a reaction form may be homogenous or heterogeneous, and a reaction solvent may be used. The method can be carried out in various solvents, the solvent is preferably a solvent in which a peroxide is dissolved, and examples include water, tetrahydrofuran, ether, 1,2-dimethoxyethane, acetonitrile, benzonitrile, acetone, methanol, ethanol, isopropanol, ethylene glycol, 2-methoxyethanol, 1-methyl-2-pyrrolidinone, dimethylformamide, dimethyl sulfoxide, acetic acid, hexane, pentane, benzene, toluene, xylene, dichloromethane, chloroform, and carbon tetrachloride. Preferable are water, tetrahydrofuran, ether, 1,2-dimethoxyethane, acetonitrile, benzonitrile, acetone, methanol, ethanol, isopropanol, ethylene glycol, 2-methoxyethanol, 1-methyl-2-pyrrolidinone, dimethylformamide, acetic acid, hexane, pentane, benzene, toluene, and xylene, more preferable are water, tetrahydrofuran, acetonitrile, acetone, methanol, ethanol, isopropanol, ethylene glycol, 2-methoxyethanol, 1-methyl-2-pyrrolidinone, dimethylformamide, and acetic acid, and further preferable are water, methanol, ethanol, isopropanol, ethylene glycol, 2-methoxyethanol, 1-methyl-2-pyrrolidinone, dimethylformamide, and acetic acid. These solvents may be used alone, or two or more kinds may be combined.

In the peroxide decomposition catalyst of the present invention, various supports, carriers, additives and the like may be used jointly, or a shape thereof may be processed, depending on various utilities. Examples of the utility include an agent for preventing deterioration of a polymer electrolyte-type fuel cell or a water electrolysis apparatus, and an antioxidant for medicaments, agrochemicals, and foods.

When the peroxide decomposition catalyst is used in the polymer electrolyte-type fuel cell or the water electrolysis apparatus, the peroxide decomposition catalyst can be used by introduction into an electrolyte, an electrode, and an electrolyte/electrode interface. The polymer electrolyte-type fuel cell is usually constructed such that a plurality of electrolyte membrane electrode-connected bodies consisting of a fuel electrode into which a fuel gas containing hydrogen is introduced, an oxygen electrode to which an oxidizing gas containing oxygen is supplied, and an electrolyte membrane held between the fuel electrode and the oxygen electrode are laminated via separators. A preferable introduction site is an oxygen electrode and an electrolyte/oxygen electrode interface.

As the method of introducing the catalyst into the electrolyte, the electrode, and the electrolyte/electrode interface, various methods can be used. Examples include a method of making a dispersion in which the peroxide decomposition catalyst is dispersed in a solution of an electrolyte such as a fluorine-based ion exchange resin (Nafion (registered trademark, manufactured by Dupont) etc.), and molding this into a membrane, and using the membrane as an electrolyte membrane, a method of coating a solution with the catalyst dispersed therein on an electrode, drying this, and connecting an electrolyte therewith to introduce a peroxide decomposition catalyst layer into an electrolyte-electrode interface, a method of dispersing an electrode catalyst in a solution with the catalyst dispersed therein, drying this, and using this as an electrode, and the like.

When the catalyst is used in medicaments, agrochemicals, and foods, suitable carriers and excipients can be used jointly. Examples of carriers and excipients which are solid include lactose, sucrose, crystalline cellulose, talc, stearic acid, lecithin, sodium chloride, and inositol, and examples of carries and excipients which are liquid include syrup, glycerin, olive oil, ethanol, benzyl alcohol, propylene glycol, water and the like.

Then, the radical analyzing method of the present invention will be explained. The radical analyzing method of the present invention is a method characterized in that a radical is quantitated by a change in a molecular weight of an aliphatic polymer using the aliphatic polymer as a radical detector. The radical analyzing method is performed by adding the aliphatic polymer which is a radical detector, to a subject reaction system, and comparing molecular weights of the aliphatic polymer before and after a test.

The aliphatic polymer which can be used as the radical detector contains an aliphatic hydrocarbon structure in a polymer main chain. Examples include polyethylene, polypropylene, polyacetylene, polyisobutylene, polybutadiene, polyisoprene, polystyrene, poly(sodium 4-styrenesulfonate), polyacrylonitrile, polyvinyl chloride, polyvinyl acetate, polyvinyl alcohol, polyvinyl butyral, polyformaldehyde, polymethyl acrylate, polymethyl methacrylate, polyhexamethyleneadipamide, polyethylene oxide, polyethylene glycol, polyisobutylene oxide, poly(ε-caprolactam), poly(1-hexene-sulfone), poly(vinylsulfone), and poly(vinylsilane), and these compounds which are arbitrarily substituted. Preferable; are polyacetylene, polyisobutylene, polybutadiene, polyisoprene, polystyrene, poly(sodium 4-styrenesulfonate), polyacrylonitrile, polyvinyl chloride, polyvinyl acetate, polyvinyl alcohol, polyvinyl butyral, polyformaldehyde, polymethyl acrylate, polymethyl methacrylate, polyhexamethyleneadipamide, polyethylene oxide, polyethylene glycol, polyisobutylene oxide, poly(ε-catrolactam), poly(1-hexene-sulfone), poly(vinylsulfone), and poly(vinylsilane), and these compounds which are arbitrarily substituted, more preferable are polyacetylene, polyisobutylene, polybutadiene, polyisoprene, polystyrene, poly(sodium 4-styrenesulfonate), polyacrylonitrile, polyvinyl acetate, polyvinyl alcohol, polyvinyl butyral, polyformaldehyde, polymethyl acrylate, polymethyl methacrylate, polyethylene oxide, polyethylene glycol, poly(1-hexene-sulfone), poly(vinylsulfone), and poly(vinylsilane), and these compounds which are arbitrarily substituted. Further preferable is poly(sodium 4-styrenesulfonate).

A weight average molecular weight of the aliphatic polymer is preferably 800 to 2,000,000, more preferably 2,000 to 1,500,000, further more preferably 10,000 to 1,000,000.

A method of assessing a molecular weight of the aliphatic polymer in the radical analyzing method can be performed by a suitable method such as a viscosity method, a gel permeation chromatography (GPC) method, a light scattering method, and a NMR method. Preferable is a GPC method.

As the molecular weight used in assessing a molecular weight of the aliphatic polymer in the radical analyzing method, for example, a weight average molecular weight or a number average molecular weight can be used. Preferable is a weight average molecular weight.

The radical analyzing method can be applied to various reaction systems, and it is desirable that aliphatic polymer radical detector components become a homogenous system. When a reaction solvent is used, the present invention can be performed with various solvents, a solvent is preferably a solvent in which the aliphatic polymer is dissolved, and examples include water, acidic buffer, tetrahydrofuran, ether, 1,2-dimethoxyethane, acetonitrile, benzonitrile, acetone, methanol, ethanol, isopropanol, ethylene glycol, 2-methoxyethanol, 1-methyl-2-pyrrolidinone, dimethylformamide, dimethyl sulfoxide, acetic acid, hexane, pentane, benzene, toluene, xylene, dichloromethane, chloroform, and carbon tetrachloride. Preferable are water, acidic buffer, tetrahydrofuran, ether, 1,2-dimethoxyethane, acetonitrile, benzonitrile, acetone, methanol, ethanol, isopropanol, ethylene glycol, 2-methoxyethanol, 1-methyl-2-pyrrolidinone, dimethylformamide, acetic acid, hexane, pentane, benzene, toluene, and xylene, more preferable are water, acidic buffer, tetrahydrofuran, acetonitrile, acetone, methanol, ethanol, isopropanol, ethylene glycol, 2-methoxyethanol, 1-methyl-2-pyrrolidinone, dimethylformamide, and acetic acid, and further preferable are water, acidic buffer, methanol, ethanol, isopropanol, ethylene glycol, 2-methoxyethanol, 1-methyl-2-pyrrolidinone, dimethylformamide, and acetic acid. These solvents may be used alone, or two or more kinds may be combined.

Examples of the acidic buffer include potassium citrate/citric acid aqueous solution, potassium dihydrogen citrate/ hydrochloric acid aqueous solution, potassium dihydrogen citrate/sodium hydroxide aqueous solution, succinic acid/sodium tetraborate aqueous solution, potassium dihydrogen citrate/sodium tetraborate aqueous solution, tartaric acid/sodium tartrate aqueous solution, lactic acid/sodium lactate aqueous solution, acetic acid/sodium acetate aqueous solution, disodium hydrogen phosphate/citric acid aqueous solution, boric acid/citric acid/trisodium phosphate aqueous solution, hydrochloric acid/potassium chloride aqueous solution, potassium hydrogen phthalate/hydrochloric acid aqueous solution, potassium hydrogen phthalate/sodium hydroxide aqueous solution, and dipotassium hydrogen phosphate/sodium hydroxide aqueous solution. Preferable are potassium citrate/citric acid aqueous solution, potassium dihydrogen citrate/sodium hydroxide aqueous solution, succinic acid/sodium tetraborate aqueous solution, potassium dihydrogen citrate/sodium tetraborate aqueous solution, tartaric acid/sodium tartrate aqueous solution, lactic acid/sodium lactate aqueous solution, acetic acid/sodium acetate aqueous solution, potassium hydrogen phthalate/sodium hydroxide aqueous solution, and dipotassium hydrogen phosphate/sodium hydroxide aqueous solution, and more preferable are potassium citrate/citric acid aqueous solution, potassium dihydrogen citric acid/sodium hydroxide aqueous solution, succinic acid/sodium tetraborate aqueous solution, potassium dihydrogen citrate/sodium tetraborate aqueous solution, tartaric acid/sodium tartrate aqueous solution, lactic acid/sodium lactate aqueous solution, and acetic acid/sodium acetate aqueous solution. A pH of the acidic buffer is preferably in a range of 1.0 to 6.5, more preferably in a range of 1.0 to 4.5.

The radical analyzing method can detect various radicals. Examples include superoxide, hydroxyl radical, nitrogen monoxide, peroxynitrite, hydroperoxy radical, RsOO. (Rs is the aforementioned saturated hydrocarbon group, aromatic group, substituted saturated hydrocarbon group, or substituted aromatic group in examples of the substituent on the substituted $Ar^1$ to $Ar^4$ aromatic hetrocycle groups), RtO. (Rt is the aforementioned saturated hydrocarbon group, aromatic group, substituted saturated hydrocarbon group, or substituted aromatic group in examples of the substituent on the substituted $Ar^1$ to $Ar^4$ aromatic hetrocycle group), and Ru. (Ru is the aforementioned saturated hydrocarbon group, aromatic group, substituted saturated hydrocarbon group, or substituted aromatic group in examples of the substituent on the substituted $Ar^1$ to $Ar^4$ aromatic hetrocycle groups). Preferable are superoxide, hydroxyl radical, and hydroperoxy radical, and more preferable is hydroxyl radical.

As an example of radical analyzing method, the aforementioned hydrogen peroxide decomposition test can be exemplified.

The present invention will be explained below by way of Examples, but the present invention is not limited by these Examples at all.

Synthesis Example 1

A bbpr ligand precursor represented by the following formula (13) was synthesized according to the description of Vickie Mckee, Maruta Zvagulis, Jeffrey V. Dagdigian, Marianne G. Patch, and Christopher A. Reed, J. Am. Chem. Soc. 1984, 106, 4765.

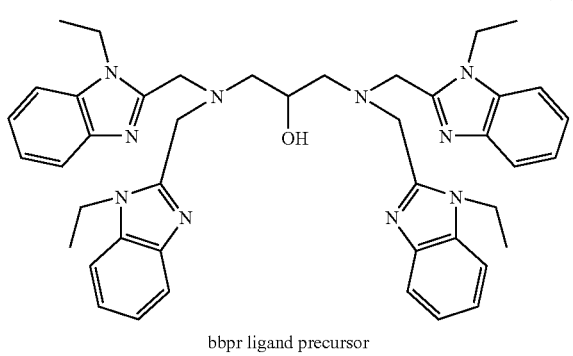

bbpr ligand precursor (13)

Synthesis Example 2

Mn-bbpr represented by the following formula (15) was synthesized according to the description of P. J. Pessiki, S. V. Khangulov, D. M. H, and G. C. Dismukes, J. AM. Chem. Soc. 1994, 116, 891. An ethanol/water-mixed solution (25.0 ml, mixing volumetric ratio; (ethanol/water)=3/1) containing acetic acid (60.0 mg, 1.00 mmol) was added to a mixture of the bbpr ligand precursor (133 mg, 0.184 mmol) and sodium acetate (54.0 mg, 0.658 mmol), and the mixture was stirred for 20 minutes. To this solution was added an ethanol (3.00 ml) solution containing manganese (II) acetate tetrahydrate (74.0 mg, 0.302 mmol), the mixture was stirred for 30 minutes and, thereafter, sodium (trifluoromethanesulfonate)(65.0 mg, 0.378 mmol) was added, followed by further stirring for 90 minutes. After completion of stirring, the reaction mixture was concentrated in an evaporator to obtain a white crystal. This crystal was filtered, washed sequentially with water, cold methanol, and ether, and vacuum-dried to obtain Mn-bbpr (156 mg, 0.140 mmol). Elementary Analysis Calcd for $C_{47}H_{52}F_6Mn_2N_{10}O_9S_2$: C, 47.48; H, 4.41; N, 11.78. Found: C, 46.84; H, 4.56; N, 11.64.

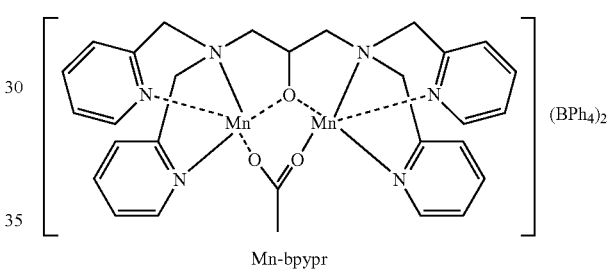

Mn-bbpr (15)

Synthesis Example 3

A bpypr ligand precursor represented by the following formula (14) was synthesized according to the description of Masaru Sato, Yutaka Mori, and Takeaki Iida, synthesis 1992, 539. An ethanol/water-mixed solution (20.0 ml, mixing volumetric ratio; (ethanol/water)=3/1) containing acetic acid (17.1 mg, 0.285 mmol) was added to a mixture of the bpypr ligand precursor (77.8 mg, 0.171 mmol) and sodium acetate (46.2 mg, 0.564 mmol), and the mixture was stirred for 15 minutes. To this solution was added manganese (II) acetate tetrahydrate (83.8 mg, 0.342 mmol), the mixture was stirred for 30 minutes and, thereafter, sodium (tetraphenylborate) (117 mg, 0.342 mmol) was added, followed by further stirring for 60 minutes. After completion of stirring, the reaction mixture was concentrated in an evaporator to obtain a white crystal. This crystal was filtered, washed with water, and vacuum-dried to obtain Mn-bbpr (114 mg, 0.0904 mmol) represented by following formula (16). ESI MS [M-BPh4]+= 941.2.

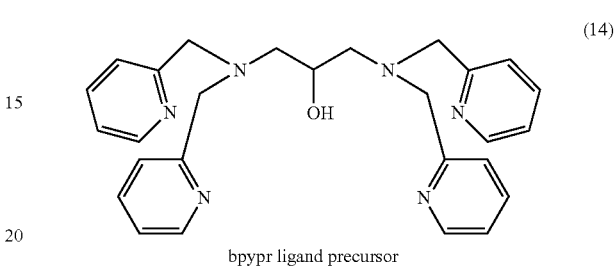

bpypr ligand precursor (14)

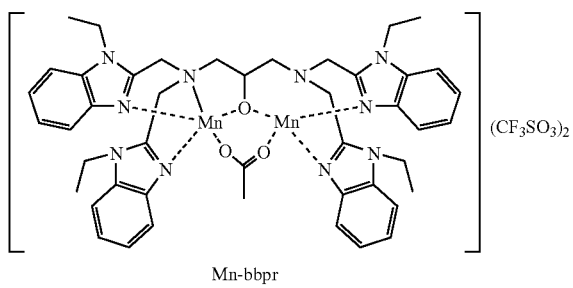

Mn-bpypr (16)

Example 1

Solubility Test of Catalyst

First, a filter paper (No 5B φ21 m/m) for Kiriyama funnel was dried (100° C., under 200 pa reduced pressure, 6 h), and this was weighed. Then, a peroxide decomposition catalyst (20.0±0.1 mg) and DMF (2.00 ml) were weighed in a 8 ml glass sample tube containing a stirrer, and this was stirred with a magnetic stirrer for 5 minutes. This mixture was transferred with a 2 ml pipette to a glass Kiriyama funnel (φ21 mm) in which the dried filter paper was spread, and this was suction-filtered. The sample tube, the stirrer and the pipette which were used, were washed with DMF several times (total amount 3.00 ml), and the attached catalyst and DMF washing solution were transferred to the Kiriyama funnel, and these were suction-filtered together. Thereafter, the residue on the filter paper, and the filter paper together with the Kiriyama funnel were dried (100° C., under 200 pa reduced pressure, 24 h) in a vacuum oven. After drying, the filter paper, and the residue on the filter paper were weighed, and a dry filter paper weight before filtration was subtracted from this weight to obtain a weight of the peroxide decomposition catalyst residue which remained undissolved in DMF. From this, solubility indicated by the (equation 3) was calculated. Results are shown in Table 1.

TABLE 1

| | Weight of peroxide decomposition catalyst mixed with DMF (mg) | Weight of peroxide decomposition catalyst residue which remained undissolved in DMF (mg) | Solubility (%) |
|---|---|---|---|
| Mn-bbpr | 20.0 | 0.20 | 99.0 |
| Mn-bpypr | 20.1 | 0.05 | 99.8 |
| Fe-pcy ($^t$Bu) | 20.0 | 0.03 | 99.8 |
| Iron phthalocyanine | 20.1 | 17.9 | 11.0 |
| Cobalt phthalocyanine | 20.1 | 17.5 | 12.9 |
| Copper phthalocyanine | 19.9 | 17.3 | 13.1 |
| Manganese dioxide | 20.0 | 12.8 | 35.8 |
| Tungstic acid | 20.1 | 19.3 | 3.88 |
| Sodium tungstate dihydrate | 20.1 | 16.5 | 17.8 |
| blank | 0.00 | 0.03 | — |

From Table 1 Mn-bbpr and Mn-bpypr, and Fe-pcy(tBu) represented by the following formula (17) of the present invention which are a complex catalyst exhibited high solubility, thereby, they can be easily introduced into a member such as an agent of preventing deterioration of a polymer electrolyte-type fuel cell and a water electrolysis apparatus, and an antioxidant for medicaments, agrochemicals and foods. On the other hand, iron phthalocyanine, cobalt phthalocyanine, and copper phthalocyanine exhibited low solubility. In addition, an inorganic compound such as manganese dioxide, tungstic acid, and sodium tungstate dihydrate also had low solubility.

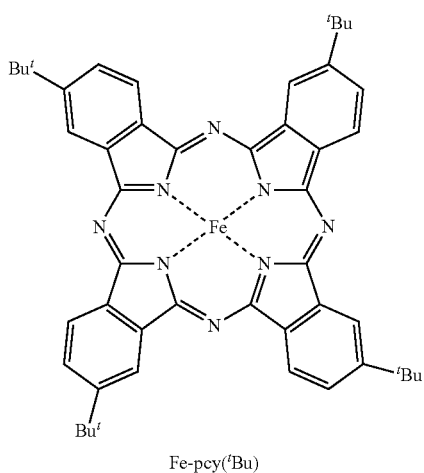

Fe-pcy($^t$Bu)

(17)

Example 2

Hydrogen Peroxide Decomposition Test Using Mn-bbpr Catalyst

Mn-bbpr (4.90 mg, 8.41 μmol (per one metal atom)), and poly(sodium 4-sutyrenesulfonate)(21.1 mg (product commercially available from Aldrich, weight average molecular weight: about 70,000)) were weighed in a two-necked flask (25 ml), and a tartaric acid/sodium tartrate buffer (1.00 ml (prepared from 0.20 mol/l tartaric acid aqueous solution and 0.10 mol/l sodium tartrate aqueous solution, pH4.0)) and ethylene glycol (1.00 ml) as a solvent were added thereto, followed by stirring. This was used as a catalyst mixed solution.

Septum was attached to one of inlets of the two-necked flask containing this catalyst mixed solution, and the other inlet was collected to a gas burette. This flask was stirred at 80° C. for 5 minutes, a hydrogen peroxide aqueous solution (11.4 mol/l, 0.20 ml (2.28 mmol)) was added via a syringe, and a hydrogen peroxide decomposition reaction was performed at 80° C. for 20 minutes. Generated oxygen was measured with a gas burette, and decomposed hydrogen peroxide was quantitated. An amount of generated oxygen was corrected based on the following blank test. Thereafter, the reaction solution was diluted with a water/acetonitrile mixed solution (water:acetonitrile=7:3 (v/v)) to a solution amount of 10.0 ml, and this solution was filtered with a syringe filter. This filtrate was GPC-measured, and a weight average molecular weight of poly (sodium 4-sutyrenesulfonate) after a test was obtained.

[Measurement of Weight Average Molecular Weight of poly (sodium 4-styrenesulfonate) after Test]

Poly(sodium 4-styrenesulfonate) after the hydrogen peroxide decomposition test was GPC-analyzed. The analyzing conditions are shown below. Column: TSKgel α-M (13 μm, 7.8 mmφ×30 cm) manufactured by Tosoh Corporation, column temperature: 40° C., mobile phase: 50 mmol/l ammonium acetate aqueous solution: $CH_3CN$=7:3 (v/v), flow rate: 0.6 ml/min, detector: RI, in injection amount: 50 μl. A weight average molecular weight was obtained as a value in terms of polyethylene oxide. Results are shown in Table 2.

[Measurement of Weight Average Molecular Weight of Poly (Sodium 4-styrenesulfonate) Before Test]

Poly(sodium 4-styrenesulfonate) (21.1 mg, product commercial available from Aldrich, weight average molecular weight: about 70,000) was dissolved in a water-acetonitrile mixed solvent (10.0 ml, water/acetonitrile=7/3 (v/v)), and a weight average molecular weight was measured under the aforementioned GPC conditions. As a result, a weight average molecular weight Mw(S) of poly(sodium 4-styrenesulfonate) before a test was $11 \times 10^4$.

[Derivation of A]

A value A was derived according to the (equation 1 Results are shown in Table 2.

$$A = (Mw(S)/Mw) - 1 \quad \text{(equation 1)}$$

(wherein Mw is a weight average molecular weight of poly (sodium 4-styrenesulfonate) after a hydrogen peroxide decomposition test, in the test using a catalyst in the presence of poly(sodium 4-styrenesulfonate), and Mw(S) is a weight average molecular weight of poly(sodium 4-styrenesulfonate) before a test)

[Quantitation of Decomposed Hydrogen Peroxide]

An amount of decomposed hydrogen peroxide was obtained from a volume of oxygen generated in the hydrogen peroxide decomposition test. By the (equation 4), an actually measured volume value v of a generated gas was converted into a gas volume V under 0° C., and 101325 Pa (760 mmHg) in view of a vapor pressure.

$$V = \{273v(P-p)\}/\{760(273+t)\} \quad \text{(equation 4)}$$

(wherein, P: atmospheric pressure (mmHg), p: water vapor pressure (mmHg), t: temperature (° C.), v: actually measured volume of generated gas (ml), V: gas volume (ml) under 0° C., and 101325 Pa (760 mmHg))

In addition, the following blank experiment was performed, and a gas volume V was corrected.

[Blank Experiment]

Poly(sodium 4-styrenesulfonate)(21.1 mg (product commercially available from Aldrich, weight average molecular weight: about 70,000)) was weighed into a two-necked flask (25 ml), and 1.00 ml of a tartaric acid aqueous solution/sodium tartrate buffer (prepared from 0.20 mol/l tartaric acid aqueous solution and 0.10 mol/l sodium tartrate aqueous solution, pH4.0) and 1.00 ml of ethylene glycol as a solvent were added thereto. Septum was attached to one of inlets of this two-necked flask, and the other inlet was connected to a gas burette. After this flask was stirred at 80° C. for 5 minutes, a hydrogen peroxide aqueous solution (11.4 mol/l, 0.200 ml (2.28 mmol)) was added, and a generated gas was quantitated with the gas burette at 80° C. for 20 minutes. It is thought that the air and the like dissolved in a solution are mainly detected. The obtained volume value was converted by the (equation 3) into the condition under 0° C. and 101325 Pa (760 mmHg) considering a vapor pressure, to obtain a corrected volume V (blank). As a result, V (blank)=2.07 (ml).

From the result of this blank experiment, a volume of generated oxygen $V(O_2)$ was defined as the (equation 5)

$$V(O_2)=V-V(\text{blank})=V-2.07 \quad \text{(equation 5)}$$

(wherein, $V(O_2)$: generated oxygen volume (ml) under 0° C., and 101325 Pa (760 mmHg), V: generated gas volume (ml) under 0° C., and 101325 Pa (760 mmHg), V(blank): corrected volume (ml) under 0° C., and 101325 Pa (760 mmHg))

From this generated oxygen volume $V (O_2)$, generated oxygen was regarded as ideal gas, and a generated oxygen mole number $N(O_2)$ was calculated.

[Derivation of Value B Indicated Reaction Rate]

Based on the following (equation 6), a B value was calculated. Results are shown in Table 2.

$$B=N(po)/N(\text{cat})=2N(O_2)/N(\text{cat}) \quad \text{(equation 6)}$$

(wherein N(po) is a mole number of hydrogen peroxide decomposed per 20 minutes in the hydrogen peroxide decomposition test, $N(O_2)$ is a mole number of an oxygen molecule generated per 20 minutes of a hydrogen peroxide decomposition reaction, and N(cat) is a mole number per one metal atom of a catalyst used)

Example 3

Hydrogen Peroxide Decomposition Test Using Mn-bpypr Catalyst

Using synthesized Mn-bpypr (5.34 mg, 8.47 μmol) as a catalyst in place of Mn-bbpr, a peroxide decomposition test was performed as in Example 1 in the presence of poly(sodium 4-styrenesulfonate)(21.1 mg (product commercially available from Aldrich, weight average molecular weight: about 70,000)), and quantitation of generated oxygen and GPC measurement of poly(sodium 4-styrenesulfonate) were performed. Results are shown in Table 2.

Comparative Example 1

Hydrogen Peroxide Decomposition Test Using Manganese Oxide Catalyst

Using manganese dioxide (0.800 mg, 9.20 μmol) as a catalyst in place of Mn-bbpr, a peroxide decomposition test was performed as in Example 1 in the presence of poly(sodium 4-styrenesulfonate) (20.9 mg (product commercially available from Aldrich, weight average molecular weight: about 70,000)), and quantitation of generated oxygen and GCP measurement of poly(sodium 4-styrenesulfonate) were performed. Results are shown in Table 2.

Comparative Example 2

Hydrogen Peroxide Decomposition Test Using Tungsten Oxide Catalyst

Using tungsten trioxide (1.99 mg, 8.58 μmol) as a catalyst in place of Mn-bbpr, a peroxide decomposition test was performed as in Example 1 in the presence of poly(sodium 4-styrenesulfonate) (21.1 mg (product commercially available from Aldrich, weight average molecular weight: about 70,000)), and quantitation of generated oxygen and GCP measurement of poly(sodium 4-styrenesulfonate) were performed. Results are shown in Table 2.

Comparative Example 3

Hydrogen Peroxide Decomposition Test Using Cerium Oxide Catalyst

Using cerium dioxide (1.48 mg, 8.60 μmol) as a catalyst in place of Mn-bbpr, a peroxide decomposition test was performed as in Example 1 in the presence of poly(sodium 4-styrenesulfonate) (21.0 mg (product commercially available from Aldrich, weight average molecular weight: about 70,000)), and quantitation of generated oxygen and GCP measurement of poly(sodium 4-styrenesulfonate) were performed. Results are shown in Table 2.

Comparative Example 4

JP-A No. 2004-296425 describes a μ-oxo dinuclear iron catalyst immobilized on a carbon surface via a ligand and, as a structure in which the number of bonds intervening between two coordination atoms is minimum in a combination of two coordination atoms separately coordinating on two iron atoms, there is a structure of the following formula (18) in which the number of bonds is 14. Then, a hydrogen peroxide decomposition test of μ-oxo iron complex ($Fe_2$—O) represented by the following formula (19), having at least one combination in which the number of bonds intervening between two coordination atoms is 13, and having no combination in which the number of bonds is not more than 12 was performed.

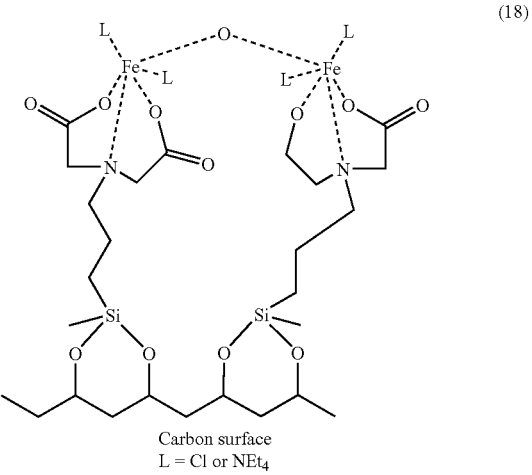

(18)

Carbon surface
L = Cl or $NEt_4$

-continued

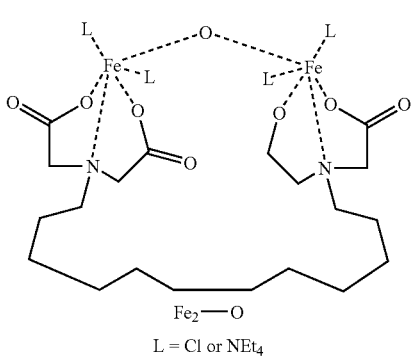

(19)

L = Cl or NEt₄

[Synthesis of Fe₂—O]

H₂N(CH₂)₁₂NH₂ (7.41 g, 37.0 mmol), 3.4 equivalent of BrCH₂CO₂Et and 3.4 equivalent of NEt(I—Pr)₂ were mixed in 150 ml of a THF-acetonitrile mixed solvent (THF/acetonitrile=2/1 (v/v)), to react them at 60° C. for 3 hours. The solvent was removed under reduced pressure, and the reaction product was purified by silica gel column chromatography (chloroform/methanol=15/1) to obtain (EtO₂CCH₂)HN (CH₂)₁₂N(CH₂CO₂Et)₂ (164 mg, 0.360 mmol).

The (EtO₂CCH₂)HN(CH₂)₁₂N(CH₂CO₂Et)₂ (164 mg, 0.360 mmol), 1.0 equivalent of BrCH₂CH₂OC(O)CH₃ and 1.8 equivalent of NEt(i-Pr)₂ were mixed in 10 ml of a THF-acetonitrile mixed solvent (THF/acetonitrile=2/1 (v/v)), to react them at 80° C. for 3 weeks. The solvent was removed under reduced pressure, and the reaction product was purified by silica gel column chromatography (chloroform/methanol=10/1) to obtain (EtO₂CCH₂)₂N(CH₂)₁₂N(CH₂CH₂OC (O)CH₃)(CH₂CO₂Et) (151 mg, 0.280 mmol). ESI MS[M+H]⁺=545.3. ¹H NMR spectrum (in CDCl₃) is shown in FIG. 1.

The resulting (EtO₂CCH₂)₂N(CH₂)₁₂N(CH₂CH₂OC(O) CH₃)(CH₂CO₂Et) (151 mg, 0.280 mmol) was heated and stirred at 70° C. overnight in a mixed solvent of THF (8 ml) and 4 mol/l HCl aq. (2 ml). Thereafter, the solvent was removed under reduced pressure to obtain (HO₂CCH₂)₂N (CH₂)₁₂N(CH₂CH₂OH)(CH₂CO₂H). This was used as it was in the following reaction of introducing an iron center.

A total amount of the resulting (HO₂CCH₂)₂N(CH₂)₁₂N (CH₂CH₂OH)(CH₂CO₂H), and (NEt₄)₂[Fe₂OCl₆] (167 mg, 0.280 mmol) (synthesized according to the description of William H. Armstrong and J. Lippard, Inorg. Chem. 1985, 24, 981) were stirred overnight in acetonitrile. The reaction solvent was removed under reduced pressure to obtain Fe₂—O (281 mg, 0.560 mmol/per one atom of Fe (a mole number of a yield was calculated form a mole number of NEt₄)₂ [Fe₂OCl₆])).

[Hydrogen Peroxide Decomposition Test Using Fe₂—O Catalyst]

Using the synthesized 1-oxo iron model complex (4.20 mg, 8.28 µmol/per one atom of Fe) as a catalyst in place of Mn-bbpr, a peroxide decomposition test was performed as in Example 1 in the presence of poly(sodium 4-styrene-sulfonate)(21.1 mg (product commercially available Aldrich, weight average molecular weight: about 70,000)), and quantitation of generated oxygen and GPC measurement of poly (sodium 4-styrenesulfonate) were performed. Results are shown in Table 2.

Comparative Example 5

Hydrogen Peroxide Decomposition Test Using Fe-pcy(ᵗBu) Catalyst

Using Fe-pcy(tBu) (6.61 mg, 8.39 µmol) represented by the formula (17) as a catalyst in place of Mn-bbpr, a peroxide decomposition test was performed as in Example 1 in the presence of poly(sodium 4-styrenesulfonate)(20.8 mg (product commercially available form Aldrich, weight average molecular weight: about 70,000)), and quantitation of generated oxygen and GPC measurement of poly(sodium 4-styrenesulfonate) were performed. Results are shown in Table 2.

Comparative Example 6

Hydrogen Peroxide Decomposition Test Using Cu/2,2'bipyridyl Catalyst

Using Cu(ClO₄)₂(H₂O)₆(3.12 mg, 8.41 µmol), and 2,2'-bipyridyl (1.31 mg, 8.41 µmol) as a catalyst according to the description of Inorg. Chem. 1979, 18, 1354 in place of Mn-bbpr, a peroxide decomposition test was performed as in Example 1 in the presence of poly(sodium 4-styrene-sulfonate)(21.0 mg (product commercially available from Aldrich, weight average molecular weight: about 70,000)), and quantitation of generated oxygen and GPC measurement of poly(sodium 4-styrenesulfonate) were performed. Results are shown in Table 2.

Comparative Example 7

Hydrogen Peroxide Decomposition Test Using Co/Glycine Catalyst

A hydrogen peroxide decomposition test of a Co/glycine catalyst was performed according to the description of J. Appl. Polym. Sci 1988, 35, 1523. A THF solution (10.0 ml) containing CoCl₂(H₂O)₆(810 mg, 3.61 mmol) was slowly added to a suspension of glycine (408 mg, 5.44 mmol) and THF (3.80 ml). After the reaction mixture was stirred for 7 days, the solvent was removed under reduced pressure. Using the resulting solid, and a tartaric acid/sodium tartrate buffer (prepared from 0.20 mol/l tartaric acid aqueous solution and 0.10 mol/l sodium tartrate aqueous solution, pH 4.0), a 8.41 µmol/ml Co complex aqueous solution was prepared. To this Co complex aqueous solution (1.00 ml, 8.41 µmol) was added ethylene glycol (1.00 ml), and poly(sodium 4-styrene-sulfonate) (21.0 mg (product commercially available from Aldrich, weight average molecular weight: about 70,000)) was dissolved therein. Using this as a catalyst mixed solution, a peroxide decomposition test was performed as in Example 1, and quantitation of generated oxygen and GCP measurement of poly(sodium 4-styrenesulfonate) were performed. Results are shown in Table 2.

Comparative Example 8

Hydrogen Peroxide Decomposition Test Using Iron Oxide Catalyst

Using Fe₃O₄ (0.650 mg, 8.41 µmol/per metal atom) as a catalyst in place of Mn-bbpr, a peroxide decomposition test was performed as in Example 1 in the presence of poly(sodium 4-styrenesulfonate) (21.1 mg (product commercially available from Aldrich, weight average molecular weight: about 70,000)), and quantitation of generated oxygen and GPC measurement of poly(sodium 4-styrenesulfonate) were performed. Results are shown in Table 2.

Comparative Example 9

Hydrogen Peroxide Decomposition Test Using Cobalt Oxide Catalyst

Using $Co_3O_4$ (0.71 mg, 8.85 mmol/per metal atom) as a catalyst in place of Mn-bbpr, a peroxide decomposition test was performed as in Example 1 in the presence of poly(sodium 4-styrenesulfonate) (21.0 mg (product commercially available from Aldrich, weight average molecular weight: about 70,000)), and quantitation of generated oxygen and GPC measurement of poly(sodium 4-styrenesulfonate) were performed. Results are shown in Table 2.

Comparative Example 10

Hydrogen Peroxide Decomposition Test Using Cerium Phosphate Catalyst

Using cerium phosphate (2.44 mg, 8.41 μmol/per metal atom) as a catalyst in place of Mn-bbpr, a peroxide decomposition test was performed as in Example 1 in the presence of poly(sodium 4-styrenesulfonate) (21.1 mg (product commercially available form Aldrich, weight average molecular weight: about 70,000)), and quantitation of generated oxygen and GCP measurement of poly(sodium 4-styrenesulfonate) were performed. Results are shown in Table 2.

Comparative Example 11

Hydrogen Peroxide Decomposition Test Using Iron Phthalocyanine Catalyst

Using iron phthalocyanine (4.83 mg, 8.41 μmol/per metal atom) as a catalyst in place of Mn-bbpr, a peroxide decomposition test was performed as in Example 1 in the presence of poly(sodium 4-styrenesulfonate) (21.1 mg (product commercially available from Aldrich, weight average molecular weight: about 70,000)), and quantitation of generated oxygen and GCP measurement of poly(sodium 4-styrenesulfonate) were performed. Results are shown in Table 2.

Comparative Example 12

Hydrogen Peroxide Decomposition Test Using Cobalt Phthalocyanine Catalyst

Using cobalt phthalocyanine (4.81 mg, 8.41 μmol/per metal atom) as a catalyst in place of Mn-bbpr, a peroxide decomposition test was performed as in Example 1 in the presence of poly(sodium 4-styrenesulfonate) (21.0 mg (product commercially available from Aldrich, weight average molecular weight: about 70,000)), and quantitation of generated oxygen and GCP measurement of poly(sodium 4-styrenesulfonate) were performed. Results are shown in Table 2.

Comparative Example 13

Hydrogen Peroxide Decomposition Test Using Copper Phthalocyanine Catalyst

Using copper phthalocyanine (4.78 mg, 8.41 μmol/per metal atom) as a catalyst in place of Mn-bbpr, a peroxide decomposition test was performed as in Example 1 in the presence of poly(sodium 4-styrenesulfonate) (21.1 mg (product commercially available from Aldrich, weight average molecular weight: about 70,000)), and quantitation of generated oxygen and GCP measurement of poly(sodium 4-styrenesulfonate) were performed. Results are shown in Table 2.

TABLE 2

|  | Example 2 | Example 3 | Comparative Example 1 | Comparative Example 2 | Comparative Example 3 | Comparative Example 4 |
|---|---|---|---|---|---|---|
| N(cat)/μmol | 8.41 | 8.47 | 9.20 | 8.58 | 8.60 | 8.28 |
| V(O2)/ml | 24.4 | 23.5 | 22.6 | 4.61 | 1.63 | 6.28 |
| N(O2)/mmol | 1.09 | 1.05 | 1.01 | 0.206 | 0.0729 | 0.281 |
| Mw | $11 \times 10^4$ | $9.7 \times 10^4$ | $8.8 \times 10^4$ | $11 \times 10^4$ | $10 \times 10^4$ | $6.2 \times 10^4$ |
| A | 0.00 | 0.13 | 0.25 | 0.00 | 0.10 | 0.77 |
| B | 259 | 248 | 220 | 48.0 | 17.3 | 65.6 |

|  | Comparative Example 5 | Comparative Example 6 | Comparative Example 7 | Comparative Example 8 | Comparative Example 9 | Comparative Example 10 |
|---|---|---|---|---|---|---|
| N(cat)/μmol | 8.39 | 8.41 | 8.41 | 8.41 | 8.91 | 8.41 |
| V(O2)/ml | 1.40 | 4.33 | 1.00 | 0.990 | 0.210 | 0.240 |
| N(O2)/mmol | 0.0625 | 0.194 | 0.0447 | 0.0443 | 0.00938 | 0.0107 |
| Mw | $7.4 \times 10^4$ | $1.7 \times 10^4$ | $9.2 \times 10^4$ | $8.1 \times 10^4$ | $9.7 \times 10^4$ | $10 \times 10^4$ |
| A | 0.49 | 5.5 | 0.20 | 0.36 | 0.13 | 0.10 |
| B | 14.9 | 46.1 | 10.6 | 10.5 | 2.11 | 2.54 |

|  | Comparative Example 11 | Comparative Example 12 | Comparative Example 13 |
|---|---|---|---|
| N(cat)/μmol | 8.41 | 8.41 | 8.41 |
| V(O2)/ml | 14.33 | 4.9 | 0.00 |
| N(O2)/mmol | 0.64 | 0.219 | 0.00 |
| Mw | $6.3 \times 10^4$ | $9.4 \times 10^4$ | $7.5 \times 10^4$ |
| A | 0.75 | 0.17 | 0.47 |
| B | 152 | 52.1 | 0.00 |

In catalysts of Comparative Examples 1, 4 and 11, a B value was not less than 60, resulting in a great reaction rate, but an A value became greater then 0.20, and a free radical generation amount was larger. In all catalysts in Comparative Examples 2, 3, 7, 10 and 12, an A value was not more than 0.20, resulting in a small free radical generation amount, but a B value was less than 60, and a reaction rate was small. In catalysts of Comparative Examples 5, 6, 8, 9 and 13, an A value became greater than 0.20, resulting in a large free radical generation amount, and a B value was less than 60, and a reaction rate was small. In addition catalysts of Comparative Examples 1 to 4, and 8 to 13 were hardly soluble or insoluble in a solvent, and are unsuitable catalysts. As described above, none of the previous catalysts were such that both of an A value of not more than 0.20, and a B value of not less than 60 are satisfied, and the catalyst is substantially soluble in a solvent.

To the contrary, as clear from Examples 2 and 3, a base metal catalyst decomposing hydrogen peroxide, which has a small A value (not more than 0.20), and a large B value (not less than 60) could be provided. Moreover, the catalyst is substantially soluble in a solvent as clear from Example 1.

Referring to a hydrogen peroxide decomposition test, then, as a peroxide in place of hydrogen peroxide, a reaction of decomposing t-butyl hydroperoxide was studied. Detailed explanation will described below.

Example 4 t-butyl Hydroperoxide Decomposition Test Using Mn-bbpr Catalyst

Using a t-butyl hydroperoxide aqueous solution (70 wt %, 0.20 ml (1.44 mmol)) as a peroxide in place of hydrogen peroxide, a peroxide decomposition test was performed as in Example 1 in the presence of a Mn-bbpr (4.90 mg, 8.41 μmol) catalyst represented by the formula (15) and poly(sodium 4-styrenesulfonate) (21.0 mg (product commercially available from Aldrich, weight average molecular weight: about 70,000)), and quantitation of generated oxygen and GCP measurement of poly(sodium 4-styrenesulfonate) were performed. From the result of GCP measurement, an A' value relating to a free radical generation amount was derived according to the (equation 7). The generated oxygen amount was corrected based on the following blank test. Results are shown in Table 3.

$$A'=Mw(s)/Mw' \quad \text{(equation 7)}$$

(wherein A' is a value relating to a free radical generation amount, Mw' is a weight average molecular weight of poly (sodium 4-styrenesulfonate) after a test, in a t-butyl hydroperoxide decomposition test using a catalyst in the presence of poly(sodium 4-styrenesulfonate), and Mw (S) is a weight average molecular weight of poly(sodium 4-styrenesulfonate) before a test).

[Blank Test in t-Butyl Hydroperoxide Decomposition Test]

Using a t-butyl hydroperoxide aqueous solution (70 wt %, 0.20 ml (1.44 mmol)) as a peroxide in place of hydrogen peroxide, a blank experiment was performed as in the hydrogen peroxide test. A generated gas was quantitated with a gas burette. It is thought that the air and the like dissolved in a solution are mainly detected. A volume value obtained herein was converted into the condition under 0° C. and 101325 Pa (760 mmHg) considering a water vapor pressure by the (equation 3), to obtain a corrected volume V' (blank). As a result, V' (blank)=1.94 (ml).

From the result of this blank experiment, a generated oxygen volume V' ($O_2$) was defined as in the (equation 8).

$$V'(O_2)=V'-1.94 \quad \text{(equation 8)}$$

(wherein V'($O_2$): generated oxygen volume (ml) under 0° C. and 101325 Pa (760 mmHg), V'=generated gas volume (ml) under 0° C. and 101325 Pa (760 mmHg) obtained by converting actually measured generated gas volume (ml) by the equation 3). Results are shown in Table 3.

Example 5 t-Butyl Hydroperoxide Decomposition Test Using Mn-bpypr

Using Mn-bpypr (5.30 mg, 8.41 μmol) represented by the equation (16) as a catalyst, a peroxide decomposition test was performed as in Example 3 in the presence of poly(sodium 4-styrenesulfonate) (20.1 mg (product commercially available form Aldrich, weight average molecular weight: about 70,000)), and quantitation of generated oxygen and GPC measurement of poly(sodium 4-styrenesulfonate) were performed. Results are shown in Table 3.

TABLE 3

|  | Example 4 | Example 5 | blank |
|---|---|---|---|
| V' (O2)/ml | 4.76 | 0.880 | — |
| Mw' | $9.4 \times 10^4$ | $9.8 \times 10^4$ | $11 \times 10^4$ |
| A' | 0.17 | 0.12 | — |

From Table 3, in Example 4 and Example 5 of the present invention, generation of a significant amount of oxygen was observed, and t-butyl hydroperoxide was catalytically decomposed with the better activity. In addition, an A' value corresponding to an A value in a hydrogen peroxide decomposition test was a value of not more than 0.20 in Example 4 and Example 5, and it was seen that a free radical generation amount is suppressed also in a decomposition reaction of t-butyl hydroperoxide.

When the catalyst of the present invention is used, at a high temperature, generation of a free radical is suppressed and a peroxide can be decomposed effectively and economically. Since the catalyst is soluble in a solvent, it is easy to introduce it into various members. In addition, in the present invention, a method of decomposing a peroxide at high temperature using the catalyst, and a method of analyzing a radical simply and at a high sensitivity as well as a process for production the catalyst can also be provided.

INDUSTRIAL APPLICABILITY

According to the present invention, a base metal catalyst which can decompose a peroxide effectively and economically even at a high temperature while suppressing generation of free radicals, and a method of decomposing hydrogen peroxide using the catalyst can be provided. In addition, the catalyst can be used in utility such as an agent for preventing deterioration of a polymer electrolyte-type fuel cell and a water electrolysis apparatus, and an antioxidant for medicaments, agrochemicals and foods. In addition, according to the process for producing a catalyst of the present invention, since the resulting catalyst can be dissolved in a solvent, it can be easily introduced into these members, being preferable. In addition, a method of analyzing a radical of the present invention is simple, and of high sensitivity, and is very useful in the aforementioned field.

What is claimed is:

1. A method of decomposing a peroxide, comprising decomposing a peroxide at not lower than 45° C. and at a pH value of 1.0 to 6.5 using a peroxide decomposition catalyst, wherein the peroxide decomposition catalyst comprises a base metal atom, wherein a value A indicating a free radical generation amount represented by the (equation 1) is not more than 0.20, and a value B indicating a reaction rate represented by the (equation 2) is not less than 60;

$$A = (Mw(S)/Mw) - 1 \quad \text{(equation 1)}$$

wherein Mw is a weight average molecular weight of poly(sodium 4-styrenesulfonate) after a hydrogen peroxide decomposition test in the test at 80° C. in the presence of poly(sodium 4-styrenesulfonate), and Mw(S) is a weight average molecular weight of poly(sodium 4-styrenesulfonate) before the test;

$$B = N(po)/N(cat) \quad \text{(equation 2)}$$

wherein N(po) is a mole number of hydrogen peroxide decomposed per 20 minutes in the hydrogen peroxide decomposition test in the (equation 1), and N(cat) is a mole number of a catalyst used per metal atom.

2. The method according to claim 1, comprising decomposing a peroxide at not lower than 70° C.

3. The method according to claim 1, wherein the catalyst is substantially soluble in a solvent.

4. The method according to claim 1, wherein the catalyst comprises a base metal polynuclear complex.

5. The method according to claim 1, wherein the base metal atom is a transition metal atom of a first transition element series.

6. The method according to claim 5, wherein the base metal atom is at least one kind base metal atom selected from the group consisting of manganese, iron, cobalt and copper.

7. The method according to claim 6, wherein the base metal atom is manganese.

8. The method according to claim 1, wherein the catalyst comprises a polynuclear complex satisfying the following requirements;

having not less than 2 of base metal atoms:

having a ligand L having not less than 2 of coordination atoms:

having a combination of AM1 and AM2 in which a minimum number of covalent bonds connecting between AM1 and AM2 is not more than 12, referring to two metal atoms selected from the not less than 2 of base metal atoms as $M^1$ and $M^2$, and referring to coordination atoms in L coordinating to $M^1$ or $M^2$ as AM1 or AM2, respectively.

9. The method according to claim 1, wherein the catalyst comprises a complex represented by the general formula (I).

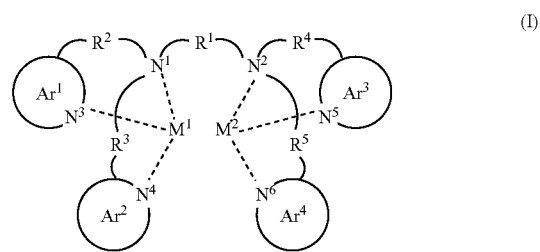

wherein $M^1$ and $M^2$ are a base metal atom, and may be the same as or different from each other, $N^1$ to $N^6$ are a nitrogen atom which is to be a coordination atom, $Ar^1$ to $Ar^4$ are an optionally substituted aromatic heterocycle having a nitrogen atom ($N^3$ to $N^6$), respectively, and may be the same as or different from each other, $R^1$ is a bifunctional organic group, the number of bonds intervening between $N^1$ and $N^2$ is not more than 12, $R^2$ to $R^5$ represent an optionally substituted bifunctional hydrocarbon group, and may be the same as or different from each other.

10. The method according to claim 1, wherein the peroxide is hydrogen peroxide.

11. The method according to claim 1, comprising decomposing a peroxide at a pH value of 1.0 to 4.5.

* * * * *